(12) United States Patent
Kim et al.

(10) Patent No.: US 9,973,685 B2
(45) Date of Patent: May 15, 2018

(54) MOBILE TERMINAL AND METHOD OF CONTROLLING THE SAME

(71) Applicant: LG ELECTRONICS INC., Seoul (KR)

(72) Inventors: Sooyoung Kim, Seoul (KR); Eunyoung Kim, Seoul (KR); Soyeon Yim, Seoul (KR); Jookyung Jun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 253 days.

(21) Appl. No.: 15/155,412

(22) Filed: May 16, 2016

(65) Prior Publication Data

US 2017/0094156 A1    Mar. 30, 2017

(30) Foreign Application Priority Data

Sep. 25, 2015    (KR) .................. 10-2015-0137126

(51) Int. Cl.
| | |
|---|---|
| G06F 3/00 | (2006.01) |
| H04N 5/232 | (2006.01) |
| G06F 3/01 | (2006.01) |
| G06F 3/0488 | (2013.01) |
| H04M 1/725 | (2006.01) |
| G06F 3/0487 | (2013.01) |
| G06F 3/0346 | (2013.01) |

(52) U.S. Cl.
CPC ......... *H04N 5/23216* (2013.01); *G06F 3/013* (2013.01); *G06F 3/017* (2013.01); *G06F 3/0346* (2013.01); *G06F 3/0487* (2013.01); *G06F 3/0488* (2013.01); *H04M 1/72583* (2013.01); *H04N 5/23293* (2013.01)

(58) Field of Classification Search
CPC ...... G06F 3/013; G06F 3/0346; G06F 3/0487; G06F 3/017; G06F 3/0488; H04N 5/23293; H04N 5/23216; H04M 1/72583
See application file for complete search history.

(56) References Cited

U.S. PATENT DOCUMENTS

| | | | |
|---|---|---|---|
| 2012/0154293 | A1 | 6/2012 | Hinckley et al. |
| 2013/0201113 | A1 | 8/2013 | Hinckley et al. |

(Continued)

FOREIGN PATENT DOCUMENTS

| | | |
|---|---|---|
| EP | 2843524 A1 | 3/2015 |

*Primary Examiner* — Muhammad N Edun
(74) *Attorney, Agent, or Firm* — Birch, Stewart, Kolasch & Birch, LLP

(57) ABSTRACT

A mobile terminal including a terminal body; a camera; a sensor configured to sense a movement of the terminal body; a display formed on the terminal body to have a first display region configured to display screen information and a second display region distinguished from the first display region; and a controller configured to in response to a sensed predetermined movement of the terminal body from a first position to a second position without a touching of the second display region, change a direction of the displayed screen information corresponding to the sensed predetermined movement of the terminal body, and in response to the sensed predetermined movement of the terminal body from the first position to the second position with the touching of the second display region, activate the camera and display a preview image in the first display region.

21 Claims, 34 Drawing Sheets

(56) References Cited

U.S. PATENT DOCUMENTS

| | | | |
|---|---|---|---|
| 2014/0104437 A1* | 4/2014 | Chao | H04N 17/002 348/187 |
| 2015/0130716 A1 | 5/2015 | Sridharan et al. | |
| 2015/0242179 A1* | 8/2015 | Benson | G06F 3/0485 715/761 |

* cited by examiner

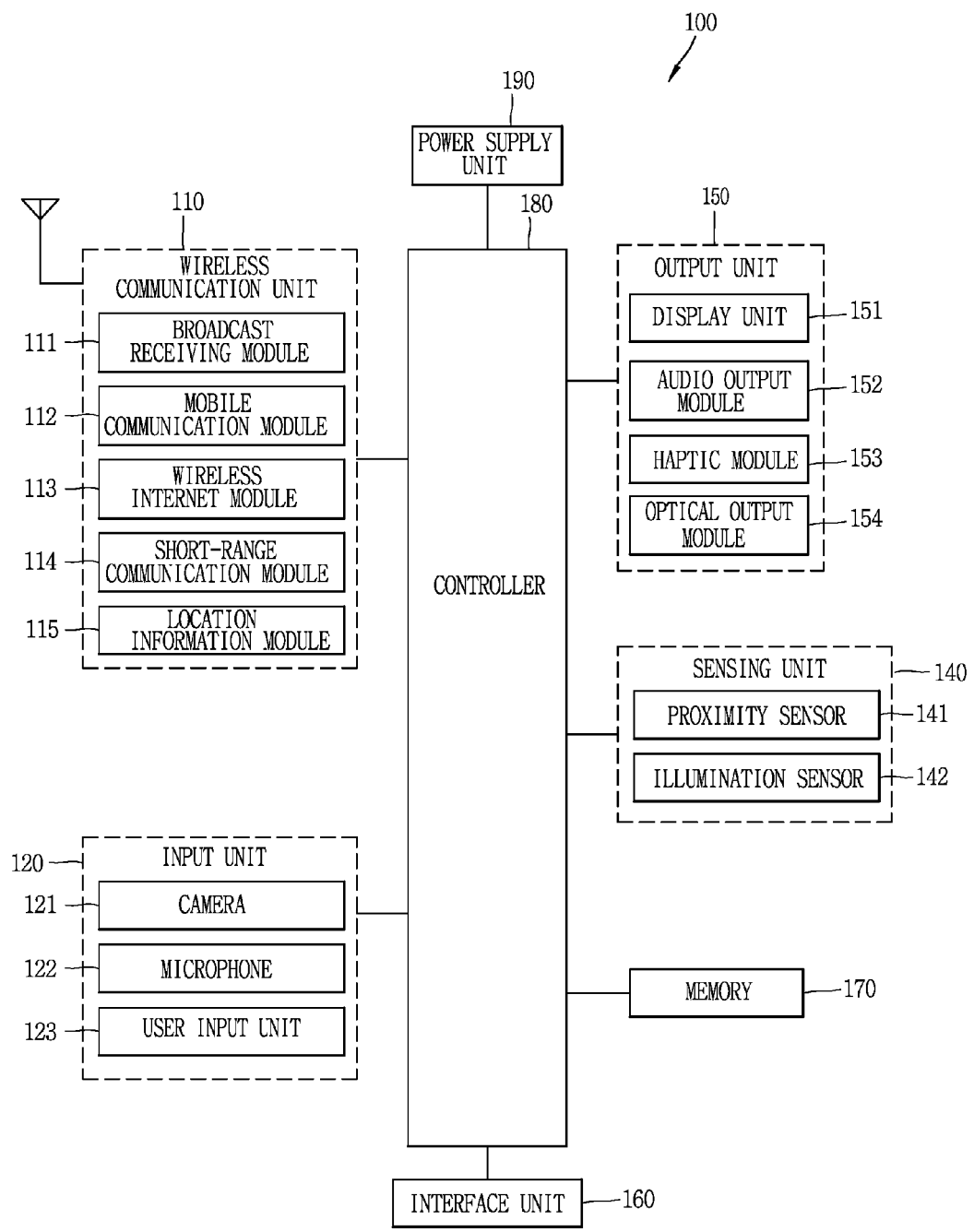

(a)

(b)

(a)

(b)

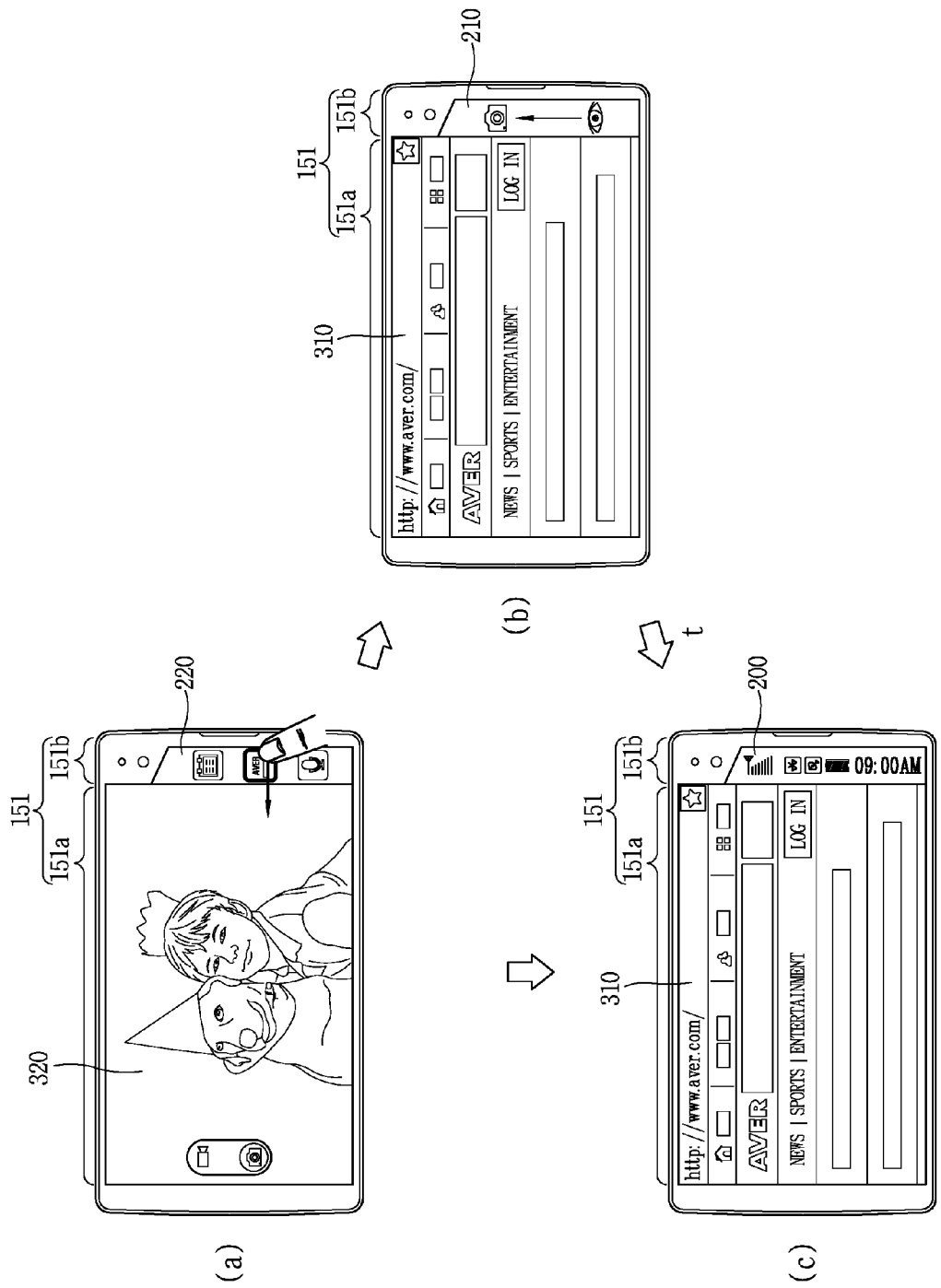

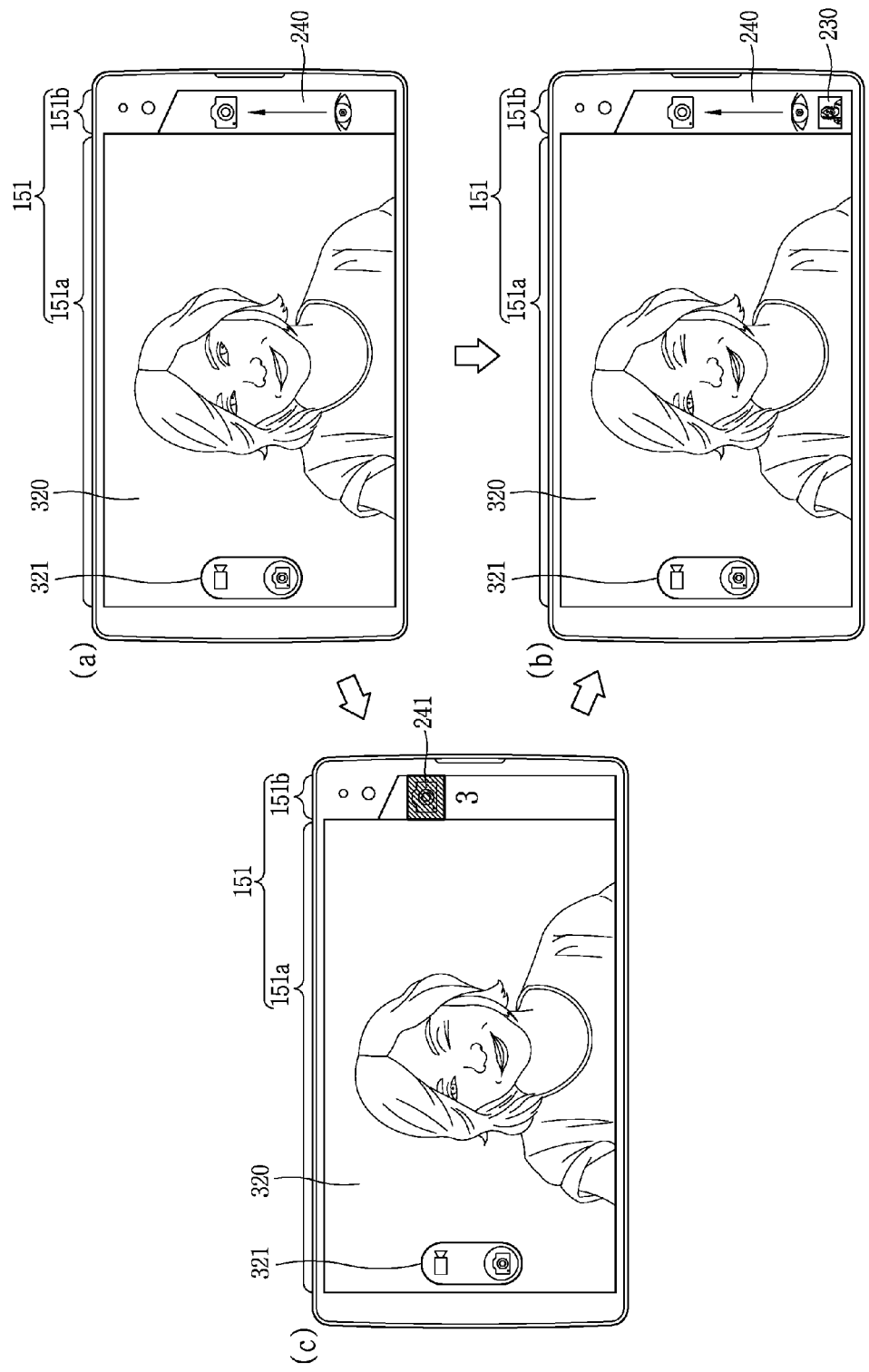

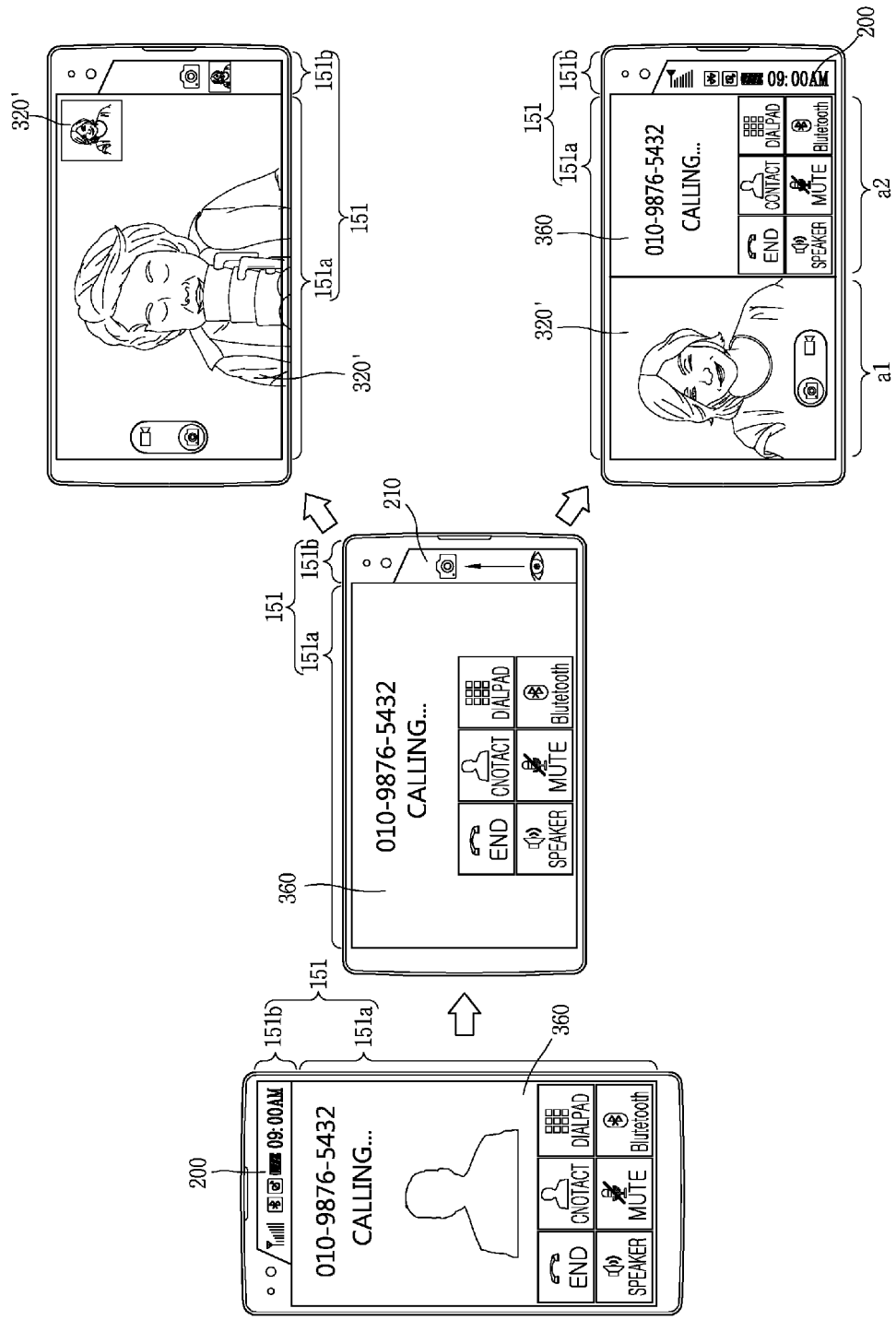

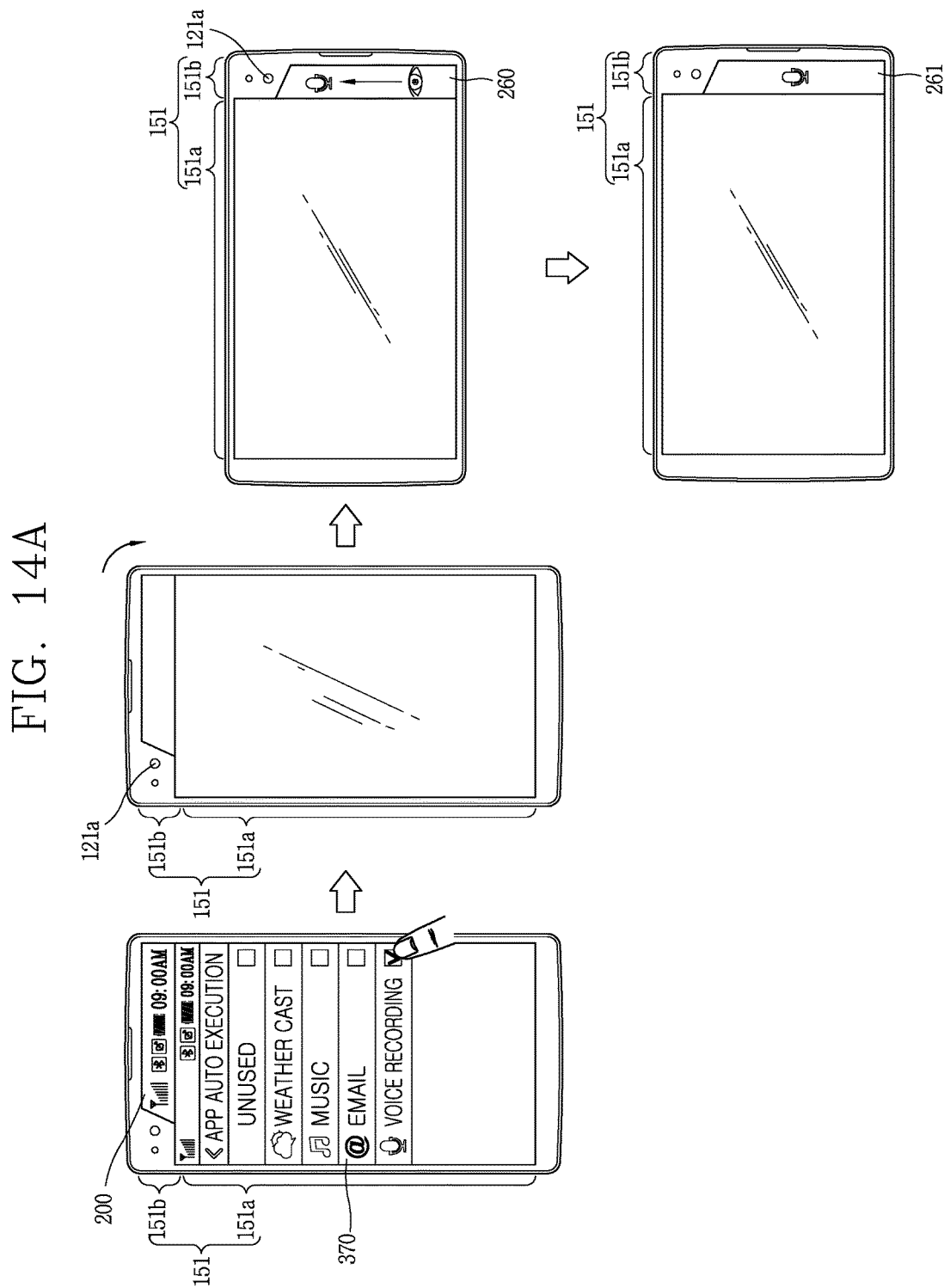

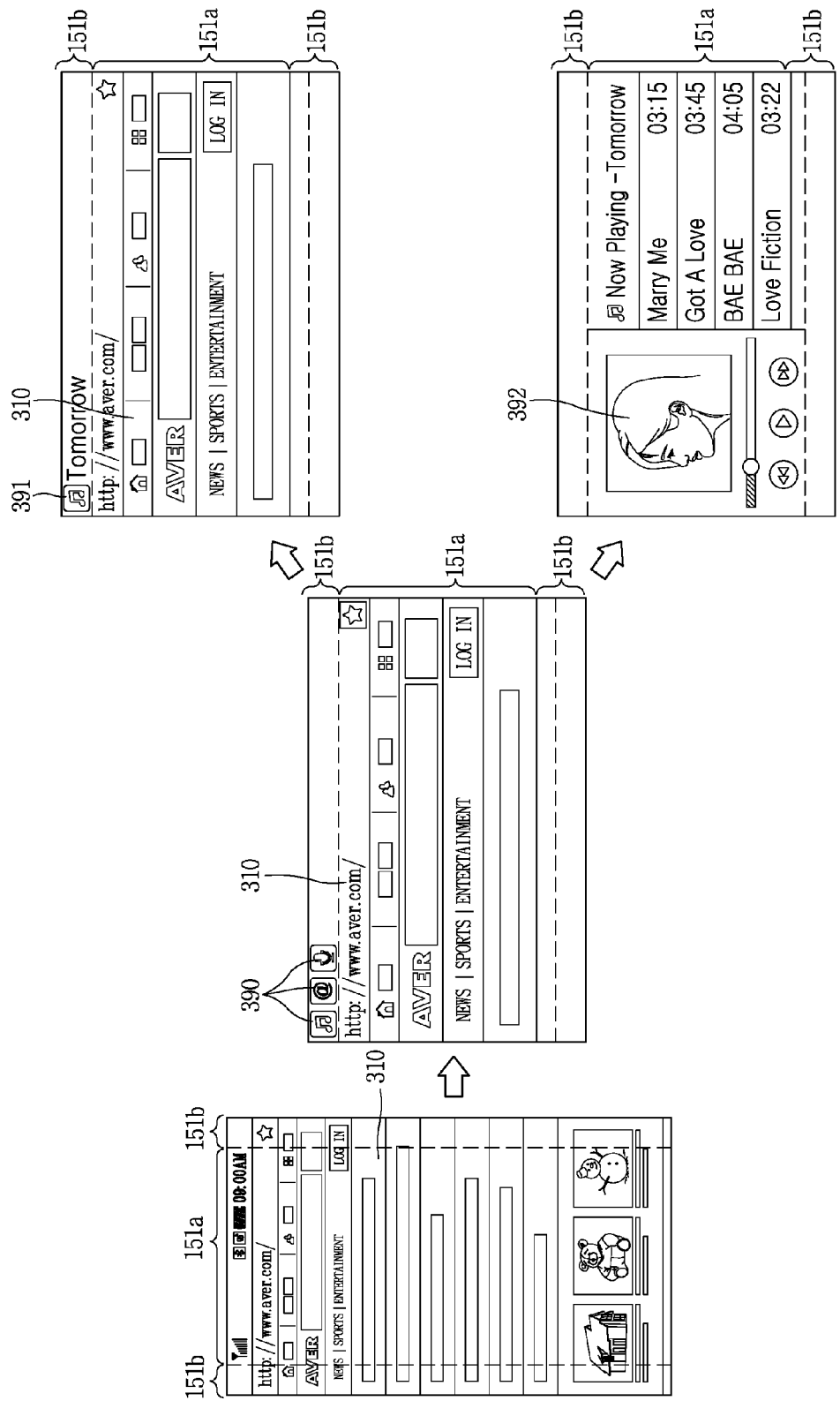

MOBILE TERMINAL AND METHOD OF CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2015-0137126 filed on Sep. 25, 2015 the contents of which is incorporated by reference herein in its entirety.

BACKGROUND OF THE INVENTION

1. Field of the Invention

The present disclosure relates to a mobile terminal having a plurality of display regions.

2. Description of the Related Art

Mobile terminals display information on a display unit using power supplied from the battery. The mobile terminal can record and play a video and display a graphic user interface (GUI), and include a laptop computer, a portable phone, glasses, a watch, a game machine, and the like capable of displaying screen information.

As it becomes multifunctional, a mobile terminal can capture still images or moving images, play music or video files, play games, receive broadcast and the like, so as to be implemented as an integrated multimedia player. However, a complicated process is needed to use such various functions.

Furthermore, in order to support and enhance the functions of the terminal, the improvement of structural or software elements of the terminal may be taken into consideration. In recent years, various types of mobile terminals have been developed. In other words, mobile terminals provided with a rectangular type of display unit in the related art have been widely distributed, but in recent years, more various types of display units have been actively developed. Accordingly, the need for development of a user experience (UX)/user interface (UI) applicable to various types of display units in addition to a single display region has been also emerged.

SUMMARY OF THE INVENTION

An aspect of the present disclosure is to provide a mobile terminal having a plurality of display regions and a control method thereof.

Another aspect of the present disclosure is to quickly execute a specific function and display its associated information using a specific region on a display, thereby providing the convenience of control for a mobile terminal.

In order to accomplish the foregoing tasks of the present disclosure, a mobile terminal according to an embodiment may include a terminal body, a camera, a display unit formed on the terminal body to have a first display region configured to display screen information and a second display region distinguished from the first display region, a sensor unit configured to sense the movement of the terminal body, and a controller configured to control a first image associated with the activation of the camera to be displayed in the second display region when the terminal body is rotated by a preset angle, wherein the controller controls the display unit to display a second image associated with the screen information when the camera is activated.

According to an example associated with the present disclosure, when the movement of the terminal body is sensed again, the controller may deactivate the camera and display the screen information again in the first display region or display the screen information again in the second display region based on a touch applied to the second image, thereby allowing the user to receive the screen information of an application that has been used with a simple manipulation.

According to an example associated with the present disclosure, the mobile terminal may further include a front camera disposed adjacent to the display unit to sense a user's line of sight, wherein the controller activates the camera when the user's line of sight is sensed by the front camera for a preset period of time, thereby allowing the user to control the camera without a touch input using his or her hand. Accordingly, it may be possible to minimize shaking that can occur while capturing.

According to an example associated with the present disclosure, when the first and the second display region are in an inactive state, the controller may activate the camera, and activate at least one of the first and the second display region, and display a captured image in the second display region based on a specific control command, thereby quickly capturing an image without activating the first display region as well as reducing unnecessary power consumption.

According to the present embodiment, a camera function may be more quickly carried out by the rotation of the terminal body. Furthermore, the information of an application that has been previously carried out may be displayed in the second display region while executing a camera function in the horizontal mode, thereby allowing the user to receive the information of the application that has been used, and more easily re-execute the relevant application.

Furthermore, an image may be captured by sensing a user's line of sight, thereby allowing the user not to move his or her hand, and accordingly minimizing vibration that can occur while capturing.

Moreover, an execution screen of an application and a preview image of the camera may be displayed at the same time to immediately apply a captured image to the operation of the application, thereby more easily controlling the application that requires a captured image.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1A is a block diagram illustrating a mobile terminal associated with the present disclosure;

FIGS. 5B through 5E are conceptual views illustrating the control method of FIG. 5A;

FIGS. 7A through 7C are conceptual views illustrating a control method of executing a capture function in a horizontal mode;

FIGS. 13A and 13B are conceptual views illustrating a control method of controlling a camera during the execution of a specific application according to still another embodiment;

FIGS. 14A and 14B are conceptual views illustrating a control method of controlling a specific function while the first display region is in an inactive state; and FIGS. 15A through 15C are conceptual views illustrating a control method of a mobile terminal including a first and a second display region according to another embodiment.

DETAILED DESCRIPTION OF THE INVENTION

Hereinafter, an embodiment disclosed in the present disclosure will be described in detail with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Although the terms first, second, etc. may be used herein to describe various elements, these elements should not be limited by these terms. These terms are only used to distinguish one element from another. When an element is referred to as being "connected with" another element, the element can be directly connected with the other element or intervening elements may also be present. In contrast, when an element is referred to as being "directly connected with" another element, there are no intervening elements present.

A singular representation may include a plural representation as far as it represents a definitely different meaning from the context. Terms 'include' or 'has' used herein should be understood that they are intended to indicate an existence of several components or several steps, disclosed in the specification, and it may also be understood that part of the components or steps may not be included or additional components or steps may further be included.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like. However, it may be easily understood by those skilled in the art that the configuration according to the exemplary embodiments of this specification can also be applied to stationary terminals such as digital TV, desktop computers and the like, excluding a case of being applicable only to the mobile terminals.

Figure 1B:
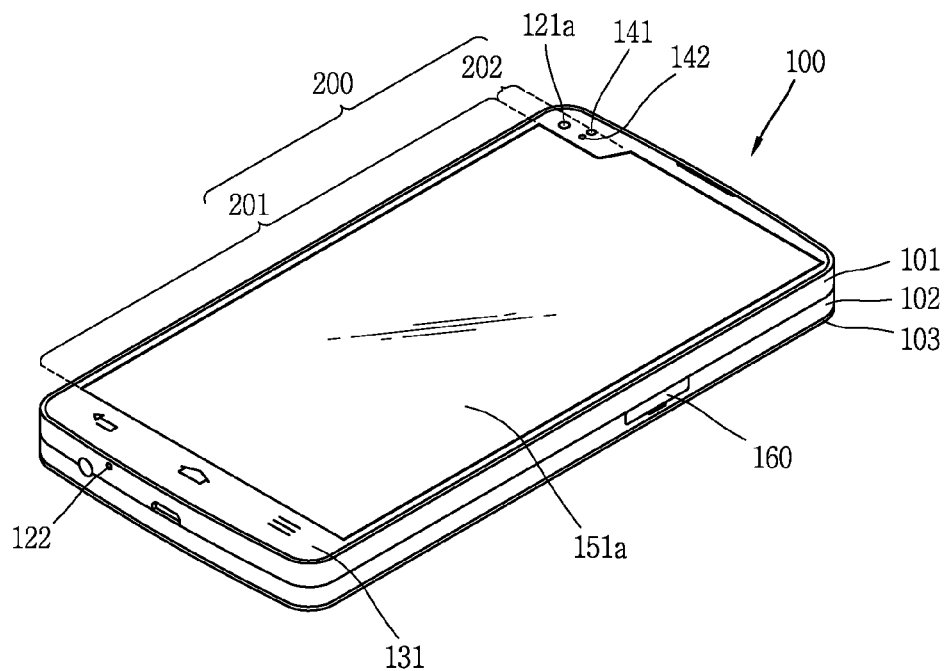
FIGS. 1B and 1C are views in which a mobile terminal associated with the present disclosure is seen from different directions.
Figure 1C:
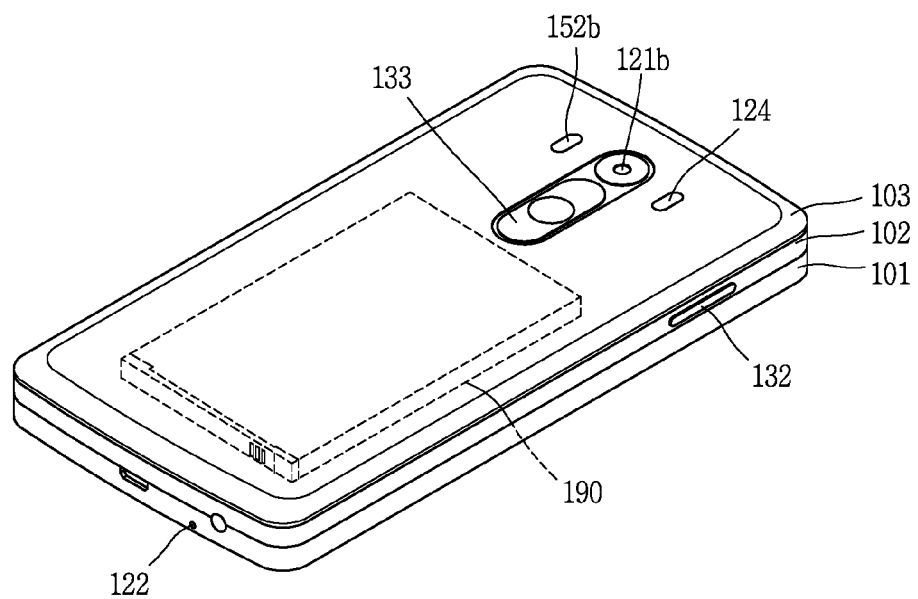

Referring to FIGS. 1A through 1C, FIG. 1A is a block diagram of a mobile terminal in accordance with the present disclosure, FIGS. 1B and 1C are conceptual views of one example of the mobile terminal, viewed from different directions. The mobile terminal 100 may include components, such as a wireless communication unit 110, an input unit 120, a sensing unit 140, an output unit 150, an interface unit 160, a memory 170, a controller 180, a power supply unit 190 and the like. FIG. 1A illustrates the mobile terminal having various components, but implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located.

For example, the wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). Further, the mobile terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output module 152, a haptic module 153, an optical output module 154 and the like. The display unit 151 may have an inter-layered structure or an integrated structure with a touch sensor so as to implement a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

Furthermore, the memory 170 may store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). Further, the application programs may be stored in the memory 170, installed in the mobile terminal 100, and executed by the controller 180 to perform an operation (or a function) of the mobile terminal 100.

The controller 180 can typically control an overall operation of the mobile terminal 100 in addition to the operations associated with the application programs. The controller 180 can provide or process information or functions appropriate for a user by processing signals, data, information and the like, which are input or output by the aforementioned components, or activating the application programs stored in the memory 170.

Furthermore, the controller 180 can control at least part of the components illustrated in FIG. 1, in order to drive the application programs stored in the memory 170. In addition, the controller 180 can drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration. First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the mobile terminal 100 to simultaneously receive at least two broadcast channels or switch the broadcast channels.

The mobile communication module 112 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.). Here, the wireless signals may include audio call signal, video (telephony) call signal, or various formats of data according to transmission/reception of text/multimedia messages.

The wireless Internet module 113 denotes a module for wireless Internet access. This module may be internally or externally coupled to the mobile terminal 100. The wireless Internet module 113 may transmit/receive wireless signals via communication networks according to wireless Internet technologies. Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), High Speed Uplink Packet Access (HSUPA), Long Term Evolution (LTE), Long Term Evolution-Advanced (LTE-A), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LET and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks.

Here, the another mobile terminal 100 may be a wearable device, for example, a smart watch, a smart glass or a head mounted display (HMD), which can exchange data with the mobile terminal 100 (or to cooperate with the mobile terminal 100). The short-range communication module 114 may sense (recognize) a wearable device, which can communicate with the mobile terminal), near the mobile terminal 100. In addition, when the sensed wearable device is a device which is authenticated to communicate with the mobile terminal 100 according to the present disclosure, the controller 180 can transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 denotes a module for detecting or calculating a position of the mobile terminal. An example of the location information module 115 may include a Global Position System (GPS) module or a Wi-Fi module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. According to the need, the location information module 115 may perform any function of the other modules of the wireless communication unit 110 to obtain data for the location of the mobile terminal in a substitutional or additional manner. The location information module 115 may be a module used to obtain the location (or current location) of the mobile terminal, and may not be necessarily limited to a module for directly calculating or obtaining the location of the mobile terminal.

Next, the input unit 120 may be configured to provide an audio or video signal (or information) input to the mobile terminal or information input by a user to the mobile terminal. For the input of the audio information, the mobile terminal 100 may include one or a plurality of cameras 121. The camera 121 may process image frames of still pictures or video obtained by image sensors in a video call mode or a capture mode. The processed image frames may be displayed on the display unit 151. Further, the plurality of cameras 121 disposed in the mobile terminal 100 may be arranged in a matrix configuration. By use of the cameras 121 having the matrix configuration, a plurality of image information having various angles or focal points may be input into the mobile terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the mobile terminal 100 (or an application program being executed). Further, the microphone 122 may include assorted noise removing algorithms to remove noise generated in the course of receiving the external audio signal.

The user input unit 123 may receive information input by a user. When information is input through the user input unit 123, the controller 180 can control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. Further, the virtual key or the visual key may be displayable on the touch screen in various shapes, for example, graphic, text, icon, video or a combination thereof.

Further, the sensing unit 140 may sense at least one of internal information of the mobile terminal, surrounding environment information of the mobile terminal and user information, and generate a sensing signal corresponding to it. The controller 180 can control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this instance, the touch screen (touch sensor) may be categorized into a proximity sensor.

Further, for the sake of brief explanation, a status that the pointer is positioned to be proximate onto the touch screen without contact will be referred to as 'proximity touch,' whereas a status that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving status, etc.). Further, the controller 180 can process data (or information) corresponding to the proximity touches and the proximity touch patterns sensed by the proximity sensor 141, and output visual information corresponding to the process data on the touch screen. In addition, the controller 180 can control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like. As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors as described above, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180 or the controller 180 itself.

Further, the controller 180 can execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 can calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor (for example, CCD, CMOS, etc.) The camera sensor may include at least one of a photo sensor and a laser sensor. The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

Furthermore, the display unit 151 may also be implemented as a stereoscopic display unit for displaying stereoscopic images. The stereoscopic display unit may employ a stereoscopic display scheme such as stereoscopic scheme (a glass scheme), an auto-stereoscopic scheme (glassless scheme), a projection scheme (holographic scheme), or the like.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals related to a particular function (e.g., a call signal reception sound, a message reception sound, etc.) performed by the mobile terminal 100. The audio output module 152 may include a receiver, a speaker, a buzzer or the like.

A haptic module 153 may generate various tactile effects the user can feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented so the mobile terminal emits monochromatic light or light with a plurality of colors. The signal output may be terminated as the mobile terminal senses a user's event checking.

The interface unit 160 may serve as an interface with every external device connected with the mobile terminal 100. For example, the interface unit 160 may receive data transmitted from an external device, receive power to transfer to each element within the mobile terminal 100, or transmit internal data of the mobile terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

Further, the identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

Furthermore, when the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

Further, as aforementioned, the controller 180 can typically control the general operations of the mobile terminal 100. For example, the controller 180 can set or release a locked state for restricting a user from inputting a control command with respect to applications when a status of the mobile terminal meets a preset condition.

Furthermore, the controller 180 can also perform controlling and processing associated with voice calls, data communications, video calls, and the like, or perform pattern recognition processing to recognize a handwriting input or a picture drawing input performed on the touch screen as characters or images, respectively. In addition, the controller 180 can control one or combination of those components in order to implement various exemplary embodiment disclosed herein on the mobile terminal 100.

The power supply unit 190 may receive external power or internal power and supply appropriate power required for operating respective elements and components included in the mobile terminal 100 under the control of the controller 180. The power supply unit 190 may include a battery. The battery may be an embedded battery which is rechargeable or be detachably coupled to the terminal body for charging.

Furthermore, the power supply unit 190 may include a connection port. The connection port may be configured as one example of the interface unit 160 to which an external (re)charger for supplying power to recharge the battery is electrically connected. As another example, the power supply unit 190 may be configured to recharge the battery in a wireless manner without use of the connection port.

Here, the power supply unit 190 may receive power, transferred from an external wireless power transmitter, using at least one of an inductive coupling method which is based on magnetic induction or a magnetic resonance coupling method which is based on electromagnetic resonance. Further, various embodiments described herein may be implemented in a computer-readable or its similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123. The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Further, in the above, a mobile terminal having a single display region has been described. A mobile terminal according to the present disclosure may include a plurality of display regions in addition to a single display region as described above. In other words, a mobile terminal according to the present disclosure may provide the convenience of control for a mobile terminal through a plurality of display regions.

Hereinafter, examples of a mobile terminal having a plurality of display regions will be described in more detail with reference to the accompanying drawings.

Figure 2:
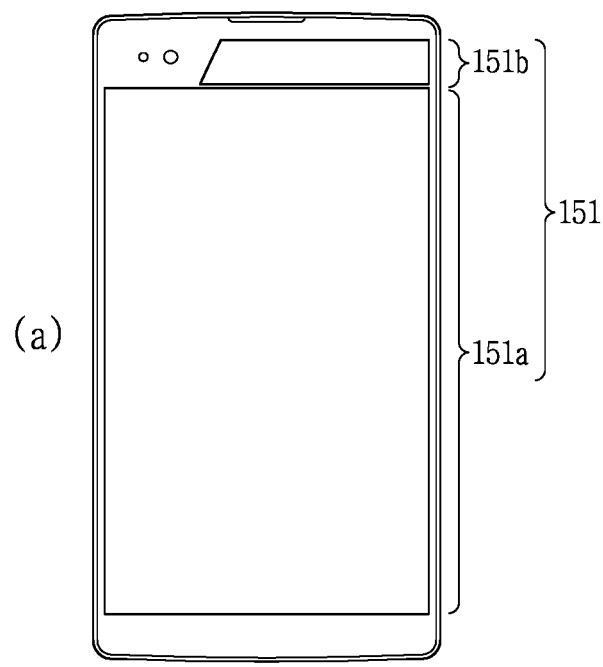
FIGS. 2, 3A and 3B are conceptual views illustrating a plurality of display regions provided in a mobile terminal according to the present disclosure.
Figure 2:
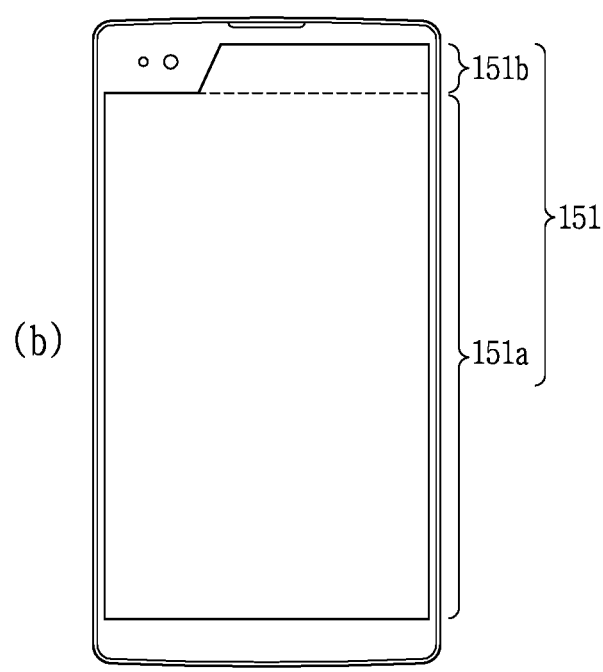
Figure 3A:
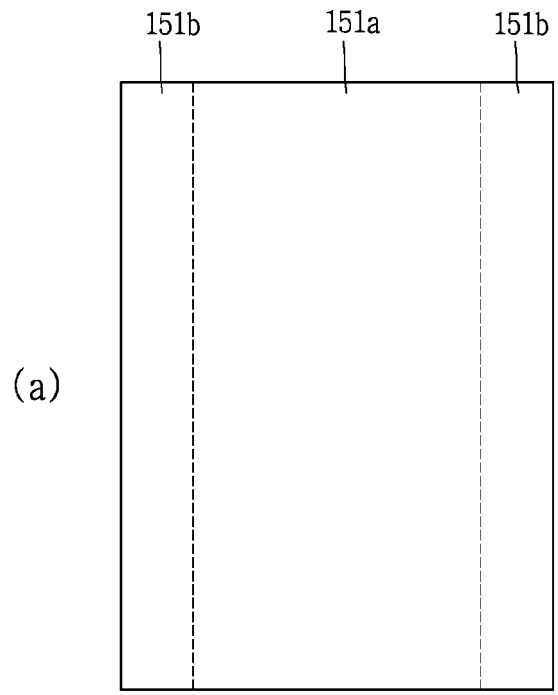
Figure 3A:
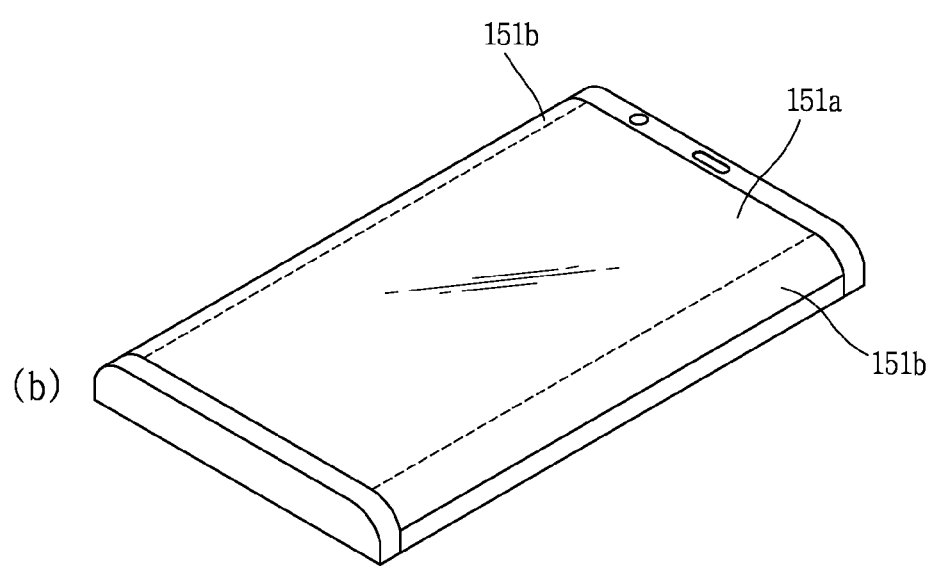
Figure 3B:
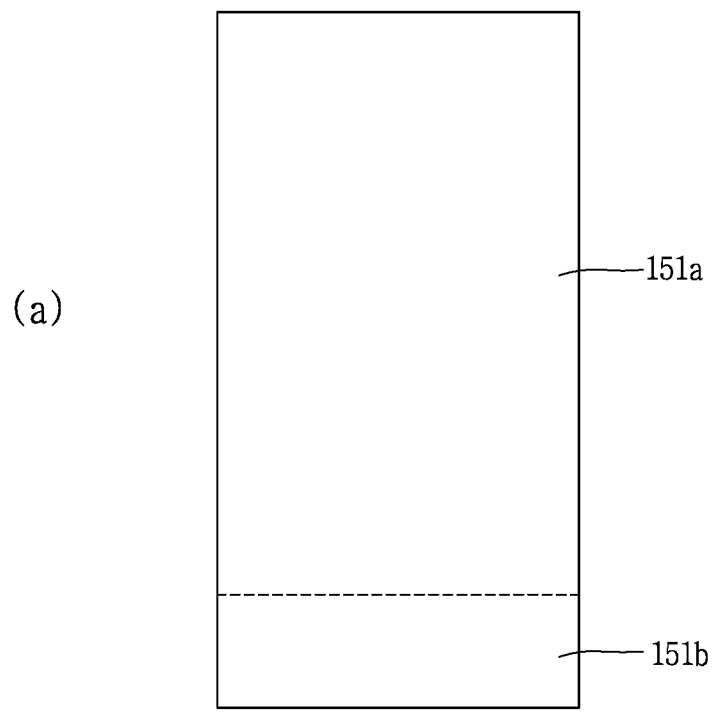
Figure 3B:
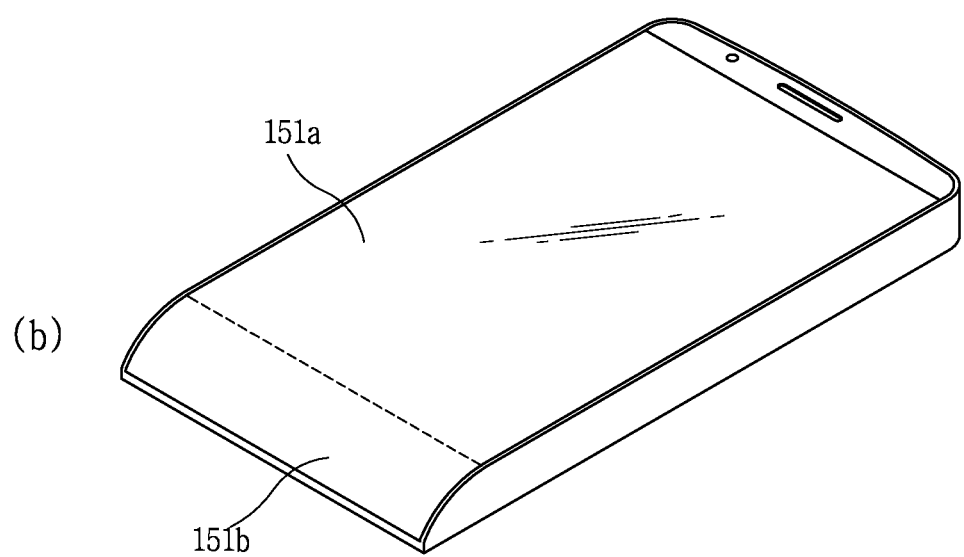

FIGS. 2, 3A and 3B are conceptual views illustrating a plurality of display regions provided in a mobile terminal according to the present disclosure. First, as illustrated in FIG. 2, the display unit 151 of a mobile terminal according to an embodiment of the present disclosure may include a plurality of display regions 151a, 151b. Here, the first and the second display unit 151a, 151b may have at least one of the same area and the same shape. On the contrary, the first and the second display unit 151a, 151b may have at least one of a different area and a different shape. For example, the area of the first display region 151a may be formed to be larger than that of the second display region 151b. Furthermore, as illustrated in the drawing, the second display region 151b may be formed to have a different shape from that of the first display region 151a.

Further, the first and the second display unit 151a, 151b may have a physically independent structure as illustrated in FIG. 1(a). In this instance, the mobile terminal 100 may include a plurality of physically independent display units (for example, two display units). When a mobile terminal according to the present disclosure has a plurality of physically divided display units, the controller controls the plurality of display units, respectively. In this instance, a sub-controller for controlling each display unit may exist to be allocated to each display unit. In other words, in a mobile terminal, the first display region 151a and the second display region 151b may be controlled by a first sub-controller and a second sub-controller, respectively. Furthermore, the first and the second sub-controller may be controlled by a main controller. In another example, the physically divided first and second display regions 151a, 151b may be also controlled by one controller.

Further, the first and the second display unit 151a, 151b may be included in a single display unit 151 as illustrated in FIG. 2(b). In other words, a single display unit 151 may include a plurality of display regions 151a, 151b. In this instance, a boundary between the plurality of display region 151a, 151b may be divided by software processing. The controller 180 can display a specific image on a boundary region between the first and the second display regions 151a, 151b to allow the user to recognize a boundary between a plurality of display regions.

Further, in this instance, the plurality of first and the second display regions 151a, 151b, respectively, may be controlled by software processing in an independent manner from each other. As described above, a mobile terminal according to the present disclosure may include a plurality of display regions (or a plurality of display units; hereinafter, commonly referred to as a "plurality of display regions") through physical division or software division.

The plurality of display regions may have various positional relationships. The second display region 151b may be located at any one side of the first display region 151a based on the first display region 151a. When the first and the second display unit 151a, 151b are provided on a single display unit, the second display region 151b may be extended from any one side of the first display region 151a based on the first display region 151a.

For example, as illustrated in FIGS. 2(a) and 2(b), the display unit 151 according to an embodiment of the present disclosure may have a structure extended in an upward direction of the first display region 151a. In other words, the second display region 151b may be located at an upper side of the first display region 151a.

In this instance, as illustrated in the drawing, the second display region 151b may be formed to be less than or equal to a horizontal length of the first display region 151a. According to the present disclosure, a case where a horizontal length of the second display region 151b is less than a horizontal length of the first display region 151a will be taken as an example. In this instance, the camera 121, the proximity sensor 141 and the illumination sensor 142 that has been located on an upper bezel of the display unit 151 may be disposed on the left side (or right side) of the second display region 151b as illustrated in FIG. 2.

When a horizontal length of the second display region 151b is formed to be less than a horizontal length of the first display region 151a, one side of the second display region 151b may be formed with one of a perpendicular surface, an inclined surface and a curved surface.

In another example, as illustrated in FIGS. 3A(a) and 3A(b), the second display region 151b may be extended in a horizontal direction of the terminal, and formed on at least one of the left and right sides of the first display region 151a. In this instance, as illustrated in FIG. 3A(b), the second display region 151b may be formed with a curved or inclined surface. In this instance, the second display region 151b may be shown when a user views the mobile terminal 100 from a front surface, and also shown when the user views the mobile terminal 100 from a lateral surface.

In still another example, as illustrated in FIGS. 3B(a) and 3B(b), the display unit 151 according to the present disclosure may have a structure extended in a downward direction of the first display region 151a based on a length direction thereof. In other words, the second display region 151b may be located at a lower side of the first display region 151a. In this instance, as illustrated in FIG. 3B(b), the second display region 151b maybe formed with a curved or inclined surface. In this instance, the second display region 151b may be shown when a user views the mobile terminal 100 from a front surface, and also shown when the user views the mobile terminal 100 from one lateral surface.

Further, a plurality of display regions according to the present disclosure may have various positional relationships and shapes in addition to the foregoing method. Moreover, the foregoing display region may be formed by a plurality of physically divided display units or may be a plurality of display regions provided on a single display unit.

Further, the present disclosure can perform the same function or provide the same effect through independent control with respect to each region regardless of whether or not the plurality of display regions are formed with a plurality of display units or a plurality of regions included in a single display unit. Accordingly, hereinafter, the present disclosure will be described regardless of whether or not the plurality of display regions are formed with a plurality of display units or a plurality of regions included in a single display unit.

Figure 4A:
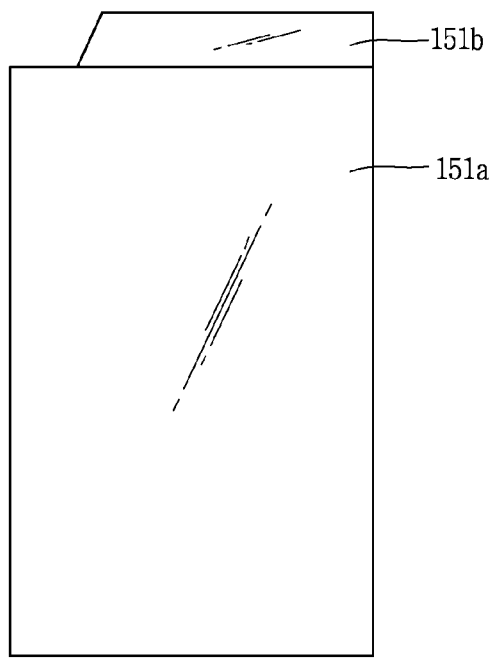
FIGS. 4A, 4B and 4C are conceptual views illustrating the operating state of a plurality of display regions in a mobile terminal according to the present disclosure.
Figure 4B:
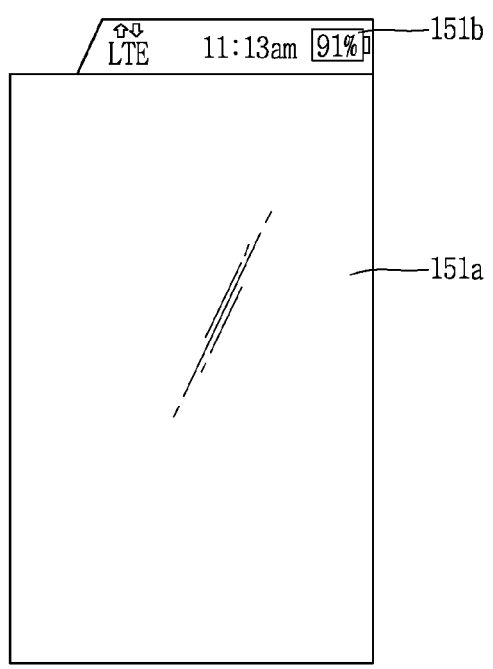
Figure 4C:
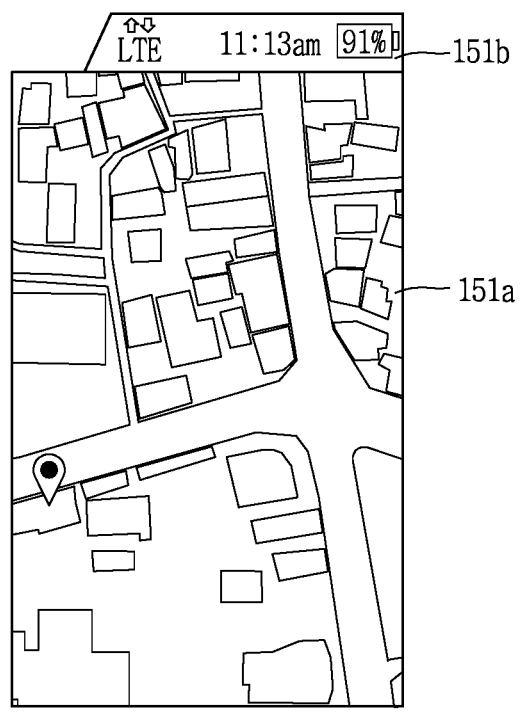

Further, the plurality of display regions may be controlled in an independent manner from each other, and hereinafter, a method of controlling a plurality of display regions will be described in more detail with reference to the accompanying drawings. In particular, FIGS. 4A, 4B and 4C are conceptual views illustrating the operating state of a plurality of display regions in a mobile terminal according to the present disclosure.

A plurality of display regions on a mobile terminal according to the present disclosure may have the same operating state or different operating states. Here, the plurality of display regions may be driven in either one of an active state and an inactive state. The active state may denote a state in which the display and touch sensing of visual information is enabled. In other words, the active state denotes a state in which the relevant display region is turned on.

Moreover, the inactive state may denotes a state in which the display of visual information is restricted. In other words, the illumination unit configured to illuminate the relevant display unit is in an off state. Further, according to an embodiment of the present disclosure, the display region in an inactive state may be configured to enable touch sensing. In other words, the display region in an inactive state may denote a state that the display of visual information is restricted and touch sensing is enabled. In other words, the controller 180 can control the relevant display region to allow touch sensing on the display region in an inactive state.

Further, according to an embodiment of the present disclosure, an inactive state in which the display of visual information is restricted, and touch sensing is enabled may be referred to as a doze mode. In this instance, it may be expressed by saying that the relevant display region is in a doze mode. In this instance, a display region in a doze mode may be activated for a preset specific period of time.

Further, the touch sensor may sense a tap applied to the display unit 151 in a different manner in an inactive state (or doze mode) and an active state. In addition, settings associated with the operation of the touch sensor may be differently set in an inactive state (or doze mode) and an active state. For example, a threshold value set to recognize a touch may be set in a different manner. In other words, the sensitivity with respect to a touch of the touch sensor may increase in an active state than an inactive state (or doze mode). It is because that the inactive state (or doze mode) is a mode for sensing a touch while reducing the consumption of power, and the active state is a mode for correctly sensing a user's input.

Further, when an initial touch is sensed in such an inactive state, the controller 180 can drive a sensing period of the touch sensor of the display region in an inactive state in the same manner as that of the touch sensor of display region in an active state. It is to enhance the accuracy of a touch applied to the display region even in an inactive state.

In this instance, a touch sensing unit in the display region in an inactive state may be driven with a different period of touch sensing even in the inactive state. For example, a touch may be sensed at a first frequency until prior to applying an initial touch, and sensed at a second frequency higher than the first frequency upon applying an initial touch. Furthermore, the controller 180 can drive the touch sensor again at a second frequency when a subsequent touch is not applied for a preset period of time while the touch sensor is driven at the second frequency.

As described above, the present disclosure can change the operation method of the touch sensor in various ways, thereby minimizing the power consumption of a mobile terminal as well as enhancing the accuracy of a touch. Further, a plurality of regions, respectively, on a mobile terminal according to an embodiment of the present disclosure may be driven in either one of an active state and an inactive state.

For example, as illustrated in FIG. 4A, the first and the second display unit 151a, 151b may be both in an inactive state. At this time, at least one of the first and the second display unit 151a, 151b may be configured to allow touch sensing even when the illumination is turned off. For example, the second display region 151b may be configured to enable touch sensing even in an inactive state. In this instance, when a preset type of touch is sensed with respect to the second display region 151b, the controller 180 can display screen information corresponding to the touch in either one of the second display region 151b and first display region 151a.

In another example, as illustrated in FIG. 4B, either one of the first and the second display unit 151a, 151b may be in an inactive state, and the other one thereof may be in an inactive state. In other words, the first and the second display unit 151a, 151b may have different operating states. Accordingly, the operating state of either one of the first and the second display unit 151a, 151b does not have an effect on that of the other one thereof. In other words, according to an embodiment of the present disclosure, a plurality of display regions may be always in an active state at the same time or may not always be in an inactive state at the same time.

Moreover, in a mobile terminal according to an embodiment of the present disclosure, any one of a plurality of display regions may be always in an active state. In other words, in this instance, a display region always in an active state may be expressed as always-on. For example, as illustrated in FIG. 4B, the second display region 151b may always maintain an active state regardless of whether the first display region 151a is in an active state or in an inactive state. Meanwhile, in this instance, an always-on target display region may be also driven in an inactive state according to the remaining battery amount of the mobile terminal.

Further, according to an embodiment of the present disclosure, when either one of a plurality of display regions is in an active state, and another region thereof is in an inactive state, a touch applied to a display region in an inactive state may be processed as a control command for a display region in an active state. For example, screen information displayed in the second display region 151b in an active state may be scrolled by a touch to the first display region 151a in an inactive state.

In another example, as illustrated in FIG. 4C, the first and the second display unit 151a, 151b may be both in an active state. The first and the second display unit 151a, 151b may be switched to an inactive state to an active state at the same time or at different time points, respectively.

The controller 180 can control the first and the second display unit 151a, 151b in an independent manner from each other. In this instance, different screen information may be displayed in the first and the second display unit 151a, 151b. In other words, information displayed in either one of the plurality of display regions may not have an effect on information displayed in the other one. In other words, information displayed in the first display region 151a may be different from information displayed in the second display region 151b.

For example, an execution screen of a first application may be displayed in the first display region 151a, and an execution screen of a second application may be displayed in the second display region 151b. In this instance, in the first display region 151a, a control command (for example, a touch input) for controlling information displayed in the first display region 151a may not have an effect on information displayed in the second display region 151b. More specifically, when a touch for scrolling information displayed in the first display region 151a is applied, the controller 180 can perform scrolling only for information displayed in the first display region 151a, and may not perform scrolling for information displayed in the second display region 151b.

Further, various information may be displayed in the first and the second display unit 151a, 151b. Moreover, when the first and the second display unit 151a, 151b are both in an active state, the first and the second display unit 151a, 151b may be switched to an inactive state at the same time or different time points. As described above, in a mobile terminal according to an embodiment of the present disclosure, the first and the second display unit 151a, 151b may have different or the same operating states.

Further, whether to drive which region of the first and the second display unit 151a, 151b in an active state or inactive state may be determined based on the user's selection or under the control of the controller 180. The first and the second display unit 151a, 151b may be i) switched from an active state to an inactive state or ii) switched from an inactive state to an active state based on a user input to a prespecified hardware key (for example, power button) provided on the body. At this time, the controller 180 can control the first and the second display unit 151a, 151b at the same time based on the application of the user input to the prespecified hardware key.

In this instance, the active state and inactive state of the first and the second display unit 151a, 151b may be switched in an independent manner from each other based on a preset type of touch applied to the relevant display region. For example, when a preset type of touch is applied to the first display region 151a when the first and the second display unit 151a, 151b are both in an active state, the controller 180 can switch the second display region 151b from an active state to an inactive state. In this instance, the active state of the first display region 151a may be maintained. Here, a preset type of touch may be a touch having a preset touch pattern. The preset touch pattern may be specified by at least one of a touch frequency, a position to which a touch is applied, and a type of touch (for example, a long touch, a short touch, a drag touch, a flick touch, and the like).

Further, only either one of the first and the second display unit 151a, 151b may be activated or deactivated based on a user input to a prespecified hardware key (for example, power button) provided on the body. In this instance, a control command for switching only either one of the first and the second display unit 151a, 151b to an active/inactive state may exist to be allocated to the prespecified hardware key.

In this instance, the other display region may be controlled by a hardware key different from the prespecified hardware key. On the contrary, the other display region may be switched to an active/inactive state by a touch input applied thereto. For example, when a preset type of touch is applied to the other display region, the controller 180 can switch the other display region from an active state to an inactive state. In this instance, any one active/inactive state may be maintained as it is. Here, a preset type of touch may be a touch having a preset touch pattern. The preset touch pattern may be specified by at least one of a touch frequency, a position to which a touch is applied, and a type of touch (for example, a long touch, a short touch, a drag touch, a flick touch, and the like).

The present disclosure displays an image for the execution of a camera in the second display region according to the movement of the terminal body for a simple execution of the camera mounted on the mobile terminal, and displays an image for notifying an application that has been previously activated in the second display region when the camera is performed. Hereinafter, a control method of controlling the function of a camera and the activation of an application using the second display unit will be described.

Figure 5A:
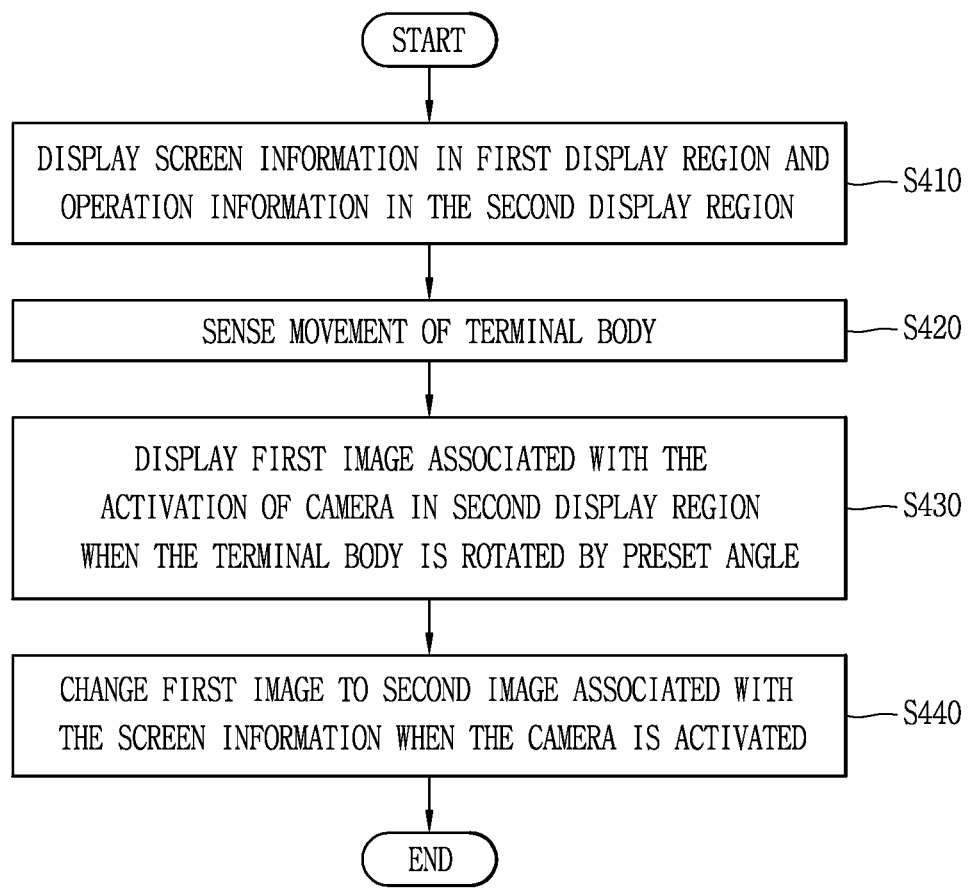
FIG. 5A is a conceptual view illustrating a control method of a mobile terminal according to an embodiment of the present disclosure.
Figure 5B:
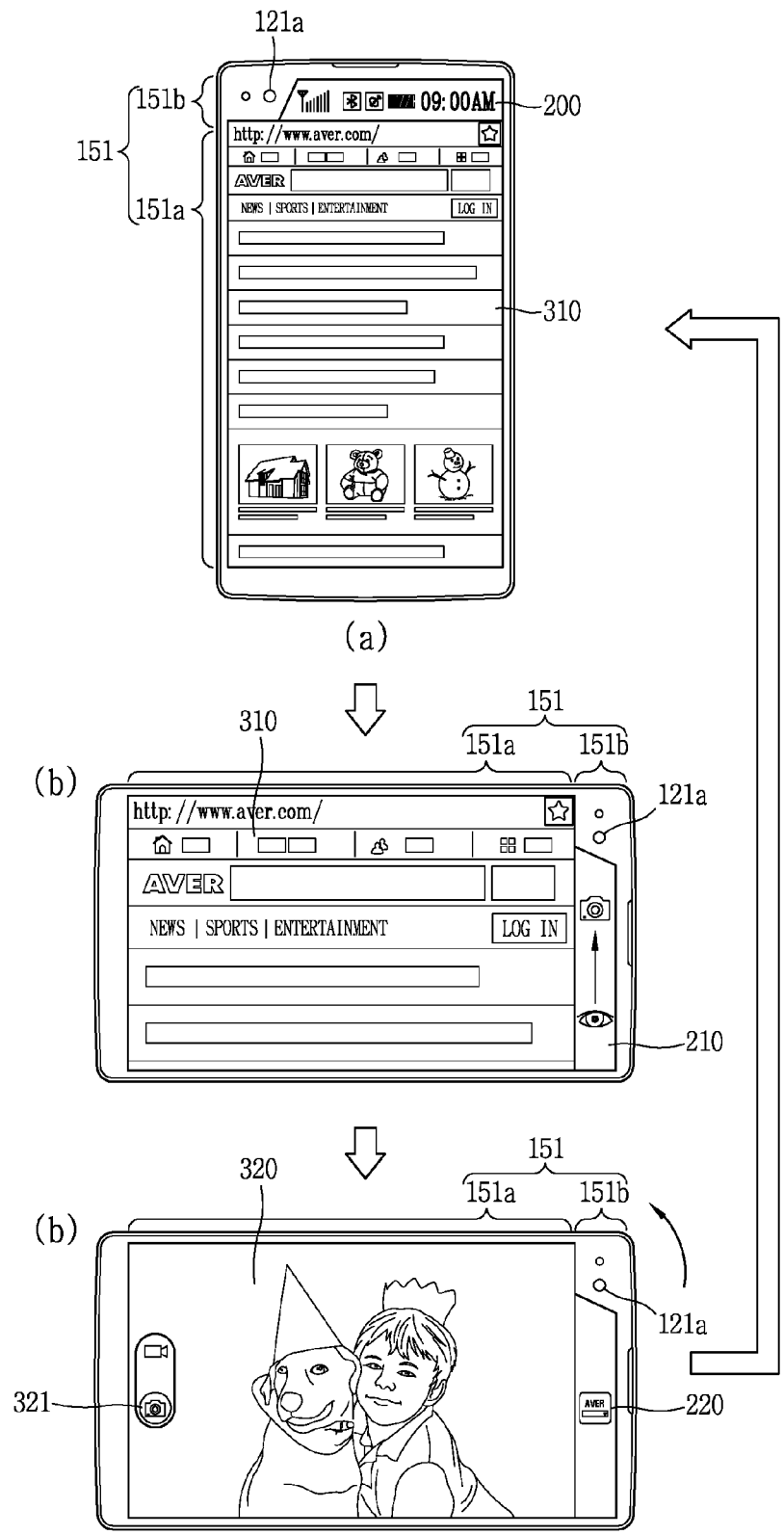

FIG. 5A is a conceptual view illustrating a control method of a mobile terminal according to an embodiment of the present disclosure, and FIGS. 5B through 5E are conceptual views illustrating the control method of FIG. 5A. Referring to FIGS. 5A and 5B, screen information 310 is displayed in the first display region 151a and operation information is displayed in the second display region 151b (S410). The screen information 310 may correspond to an execution screen of an executed application. Otherwise, the screen information 310 may correspond to a home screen page including an icon of at least one application.

The operation information 200 may include information on a notification mode, a communication status, a battery remaining capacity as well as a current date, a current time of the mobile terminal 100. Furthermore, when an event occurs, the operation information 200 may include an icon or the like on the event.

The sensing unit 140 of the mobile terminal may include a movement sensor unit for sensing the movement and rotation of the terminal body. The movement sensor unit may include an acceleration sensor, a magnetic sensor, a gravity sensor (G-sensor), a gyroscope sensor, and the like. The sensing unit 140 senses the posture of the terminal body. Furthermore, the sensor unit senses the inclination, movement, rotation or the like of the body.

Here, the posture of the terminal body may correspond to an arrangement sensed by the G-sensor. The operation mode of the mobile terminal is divided into a vertical mode and a horizontal mode based on the posture of the display unit 151 with respect to the gravity direction. The vertical mode corresponds to when the gravity direction is substantially the same as a length direction of the display unit 151. The display direction of screen information displayed on the display unit 151 in the vertical mode is also the same as the length direction of the display unit 151.

The horizontal mode corresponds to when the gravity direction crosses the length direction of the display unit 151. In other words, it corresponds to when a width direction of the display unit 151 and the gravity direction are arranged in substantially the same direction. The display direction of screen information in the horizontal mode is the same as the width direction of the display unit 151.

In other words, the same screen information is displayed in different directions in the horizontal mode and vertical mode, respectively. FIG. 5B(a) illustrates a first display region in which the screen information 310 is displayed when the mobile terminal is in a vertical mode.

Referring to FIG. 5B(b), the sensing unit 140 senses the movement of the terminal body (S420). The controller 180 switches from the vertical mode to the horizontal mode when the terminal body is rotated by a preset angle. Otherwise, the controller 180 can switch from the vertical mode to the horizontal mode based on the posture of the terminal body and the gravity direction.

The first display region changes the display direction of the screen information. When the terminal body is rotated by a preset angle, a first image 210 associated with the activation of the camera 121 is displayed in the second display region (S430). For example, the first image 210 may include guide information for activating the camera 121. The guide information may include an image or text. As illustrated in the drawing, the guide information may include information of viewing the second camera 121a for the activation of the camera.

When a user's line of sight is sensed by the second camera 121a for a preset period of time (e.g., several seconds), the controller 180 can activate a camera application to activate the camera 121 and execute a capture function of the camera. Otherwise, the controller 180 can activate the camera 121 based on a touch applied to the first image 210.

When the camera 121 is activated, the controller controls the display unit to display a preview image 320 acquired by the camera 121 in the first display region. When the camera 121 is activated, the controller 180 controls the display unit to change the first image 210 to a second image 220 associated with the screen information 310 (S440). The second image 220 may correspond to an icon of an application associated with the screen information 310, an image indicating the screen information 310 or the like.

The controller 180 can control the camera 121 to execute a capture function when a preset control command is applied while displaying the preview image 320. For example, the first display region may include a capture icon 321 for receiving a touch on the preview image 320. The controller 180 can store the preview image 320 based on a touch applied to the capture icon 321.

When the movement of the terminal body is sensed by the sensing unit 140, the controller 180 switches from the horizontal mode to the vertical mode again. When the posture of the terminal body is switched to a vertical mode, the controller 180 displays the screen information 310 corresponding to the second image 220 in the first display region. The second display region 151b may display the operation information 200 again.

According to an embodiment of the present disclosure, when the terminal body is rotated and switched to a horizontal mode, a camera function can be more quickly performed. Furthermore, the information of an application that has been previously performed in the second display region 151b is displayed while the function of the camera is performed in the horizontal mode, and thus the user can expect an application to be performed when switched to a horizontal mode again.

Referring to FIG. 5C, a touch can be applied to the second image 220 to display the screen information 310 again. The touch may corresponds to a dragging type of touch or flicking type of touch initially applied to the second image 220 and released from the first display region 151a. Otherwise, the screen information 310 may be displayed by a single touch or the like applied to an icon included in the second image 220.

Referring to FIGS. 5C(a) and 5C(b), the controller 180 displays the screen information 310 which is an execution screen of an application corresponding to the second image 220 in the first display region 151a. In this instance, the controller 180 can control the display unit to display the first image 210 including guide information associated with the activation of the camera in the second display region 151b. When a user's line of sight is sensed by the second camera 121a, the controller 180 can activate the camera 121 again and display the preview image again.

When a user's line of sight is not sensed by the second camera 121a for a preset period of time when the first image 210 is displayed, the controller 180 can switch the first image 210 to the operation information 200. While the operation information 200 is displayed, the second camera 121a does not sense the user's line of sight.

Otherwise, as illustrated in FIGS. 5C(a) and 5C(c), the controller 180 can display the screen information 310 and the operation information 200 on the first and the second display unit 151a, 151b, respectively, based on a touch applied to the operation information 200. According to the present embodiment, the user can display an execution screen of an application that has been displayed prior to the switching of the terminal to a horizontal mode using the second image. Accordingly, the user can more easily execute an application that has been used.

Figure 5D:
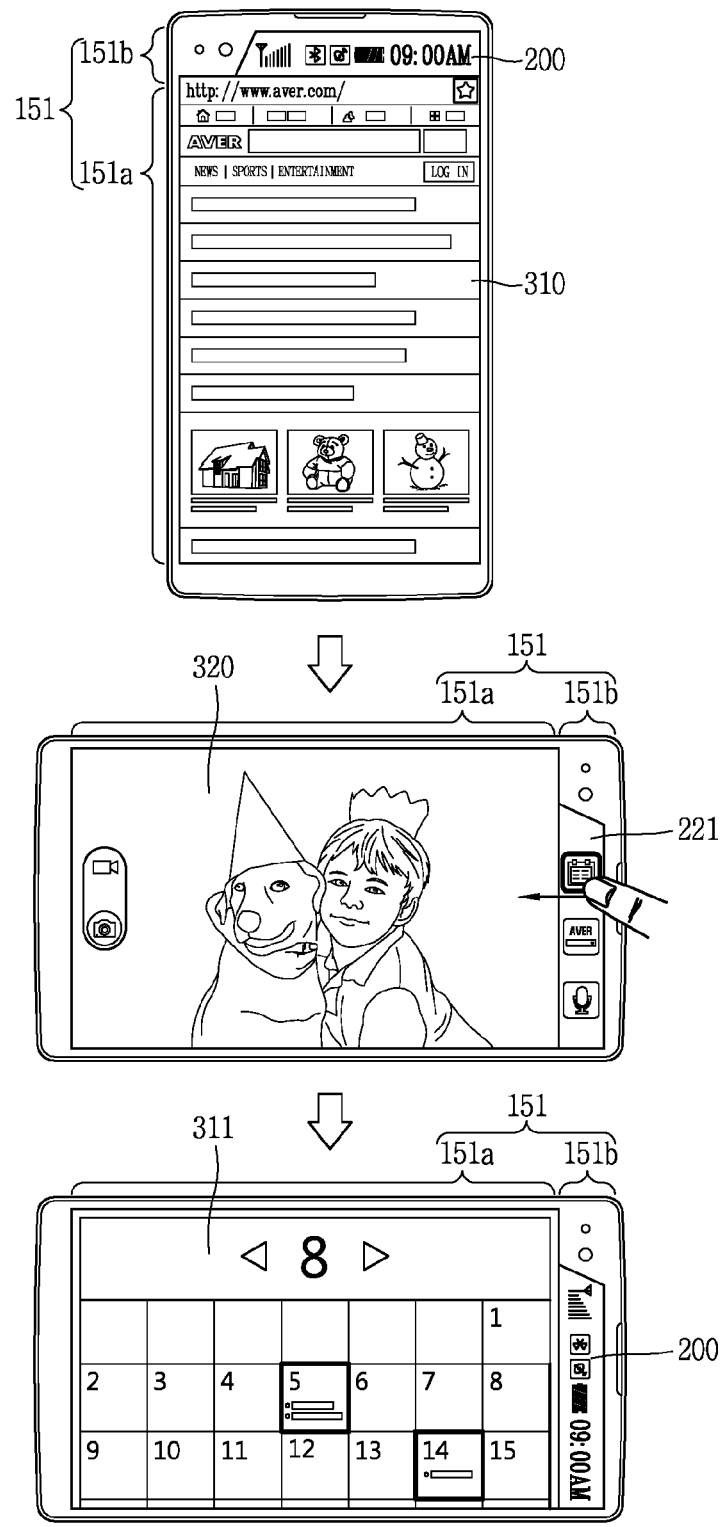

Referring to FIG. 5D, when a plurality of applications are being performed prior to switching to the horizontal mode, the controller 180 can display a third image 221 including a plurality of icons corresponding to the plurality of applications in the second display region 151b. For example, while the screen information 310 which is an execution screen of a first application is displayed, other applications being performed maintain an inactive state. The controller 180 displays an execution screen 311 of an application selected based on a touch applied to one icon on the third image 221 in the first display region 151a.

The execution screen 311 corresponds to an application different from the screen information 310. According to the present embodiment, the user can immediately execute an application currently being performed or maintained in an inactive state or an application prior to switching to a horizontal mode.

Figure 5E:
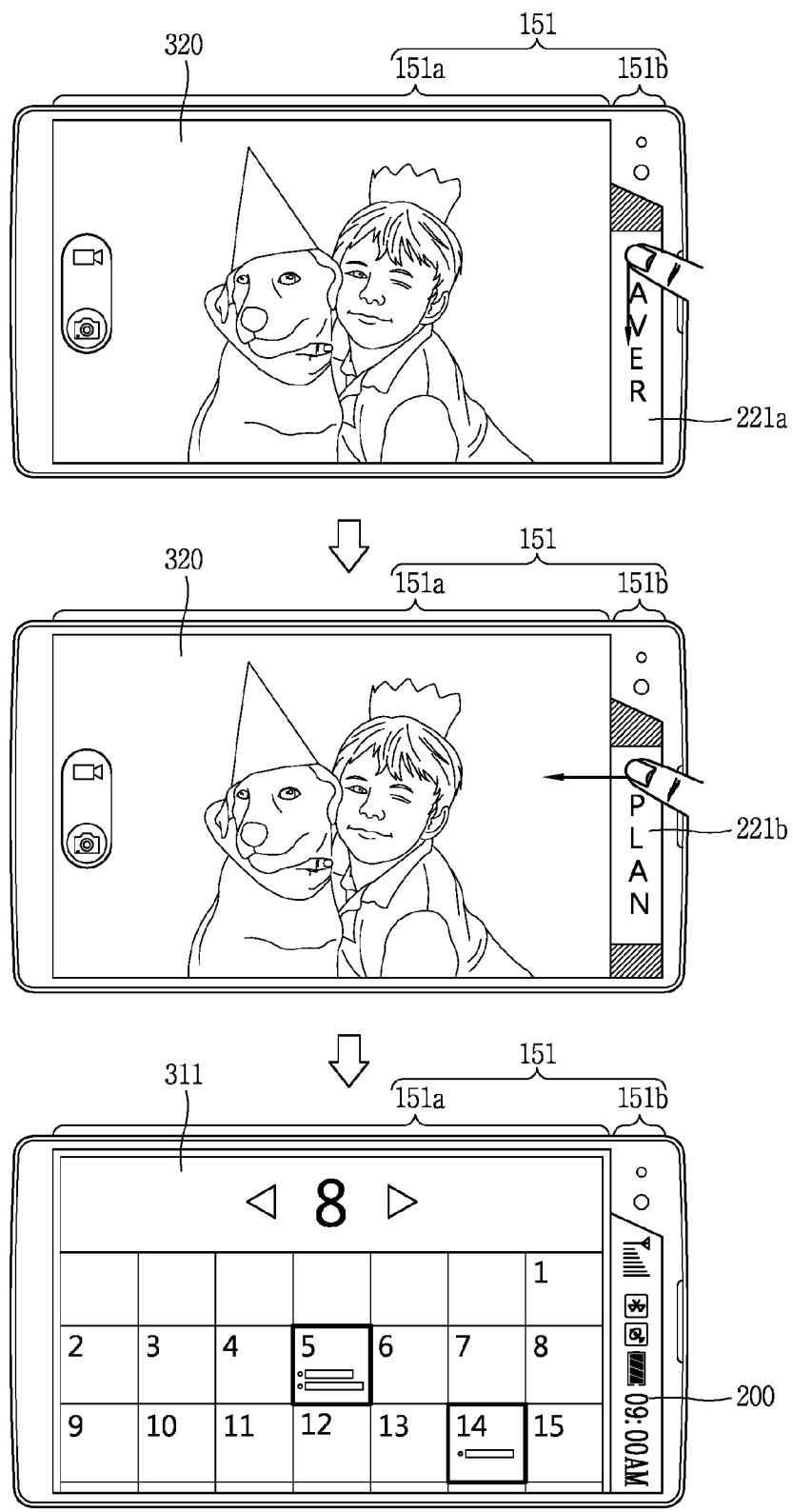

Referring to FIG. 5E, the controller 180 displays a first icon 221a corresponding to a first application being performed while the camera 121 is activated to display the preview image 320 in the first display region 151a. The controller 180 displays a second icon 221b corresponding to a second application being performed based on a dragging input (or flicking input) applied to the first icon 221a. The direction of the dragging input may be substantially the same as an extension direction of the second display region.

The controller 180 can display the execution screen 311 of the second application in the first display region 151a based on a consecutive touch applied to the first display region 151a from the second icon 221b when that the second icon 221b is displayed.

Figure 6:
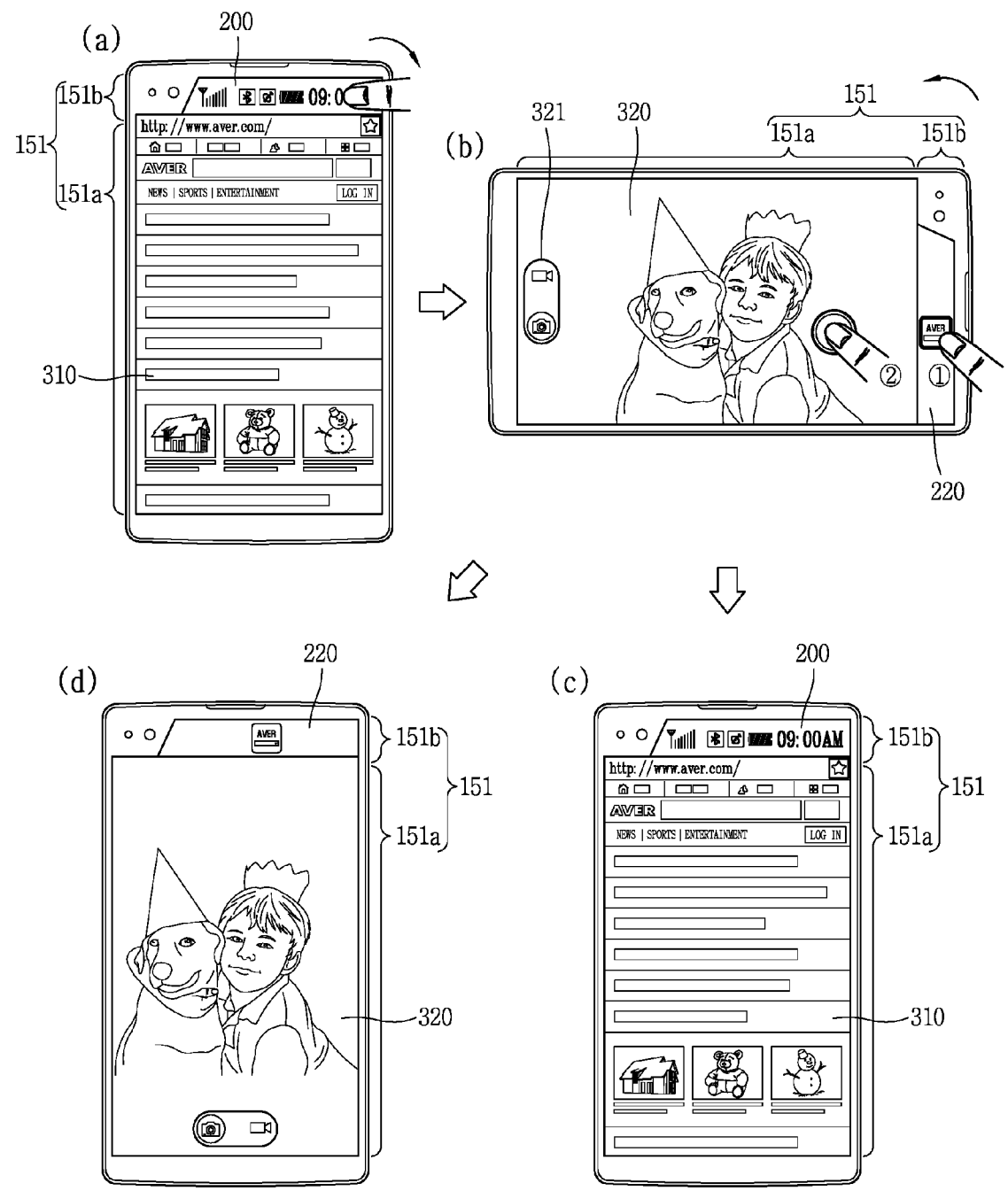
FIG. 6 is a conceptual view illustrating a control method of executing a camera function according to another embodiment.

FIG. 6 is a conceptual view illustrating a control method of executing a camera function according to another embodiment. The first display region 151a displays screen information 310, and the second display region 151b displays operation information 200. As shown in FIGS. 6(a) and 6(b), when the mobile terminal is rotated while applying a touch to the second display region 151b, the controller 180 can activate the camera.

When the camera is activated, the first display region 151a displays the preview image 320, and the second display region 151b displays a second image 220 associated with the screen information 310. The first display region 151a may display a capture icon 321 for the control of the camera.

Referring to FIGS. 6(b) and 6(c), when the rotation (movement) of the terminal body is sensed in a state (1) that a touch is applied to the second display region 151b, the controller 180 displays the screen information 310 in the first display region 151a. The mobile terminal switches to a vertical mode based on the rotation of the terminal body. Furthermore, the operation information 200 may be displayed on the second display region 151b.

Referring to FIGS. 6(b) and 6(d), when the rotation (movement) of the terminal body is sensed in a state (2) that a touch is applied to the first display region 151a, the controller 180 maintains an active state of the camera 121. Accordingly, the first display region 151a displays a preview image 320 acquired by the camera 121.

Furthermore, the second display region 151b maintains the display of the second image 220 associated with the screen information 310. The controller 180 can switch the preview image 320 to the screen information 310 again based on a touch applied to the second image 220. According to the present embodiment, it is possible to immediately activate a camera based on a touch applied to the second display region 151b, and maintain an active state of the camera even in a vertical mode based on a touch applied in a horizontal mode.

Figure 7A:
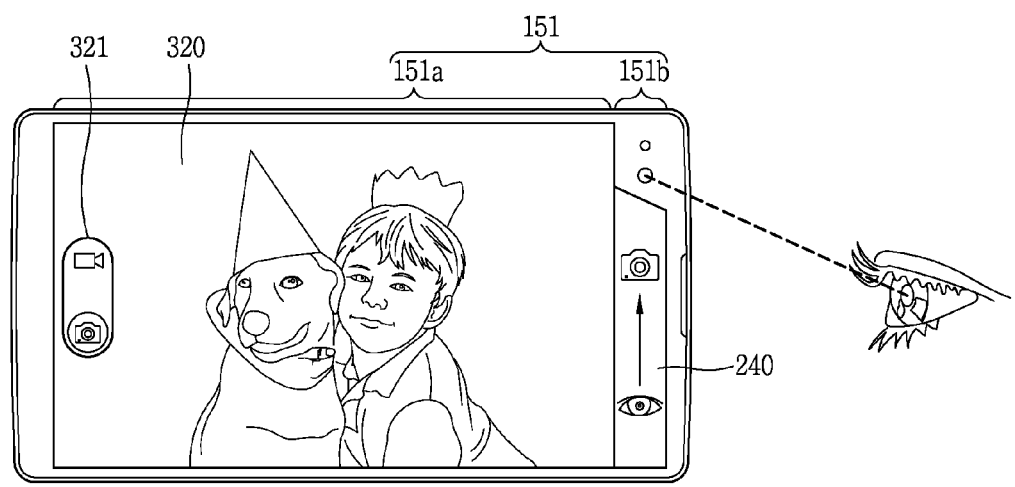
Figure 7A:
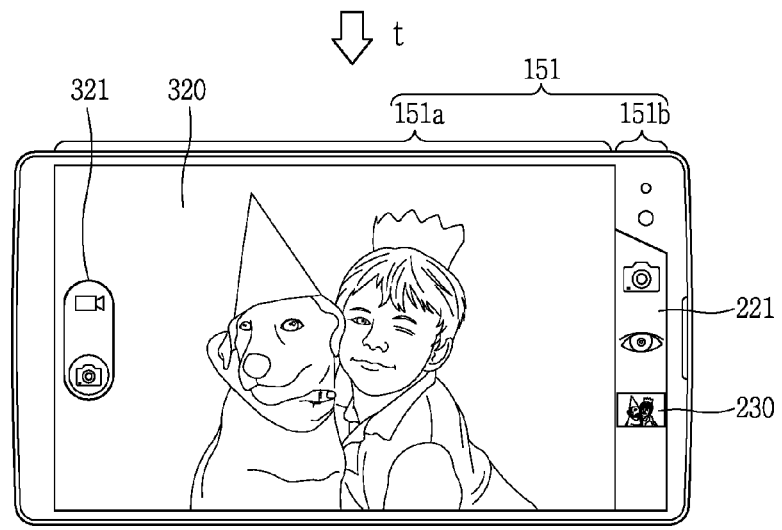
Figure 7C:
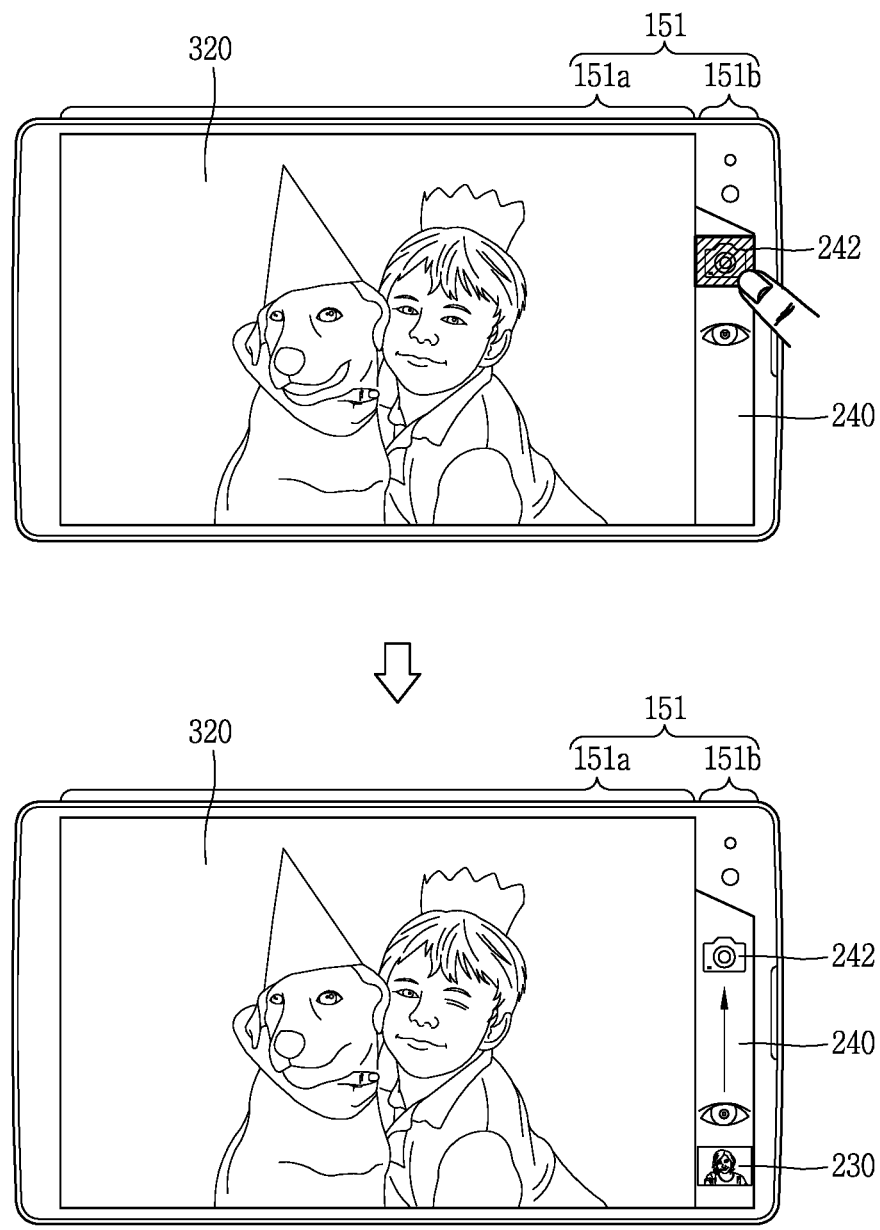

Next, FIGS. 7A through 7C are conceptual views illustrating a control method of executing a capture function in a horizontal mode. Referring to FIG. 7A, the first display region 151a displays a preview image 320 acquired by the activation of the camera 121, and the second display region 151b displays a control image 240 for forming a control command of the capture.

The control image 240 may include guide information of viewing the camera for capturing. The control image 240 may include a setting icon for changing the settings of the camera. For example, the control image 240 may include icons for a change of the front or rear camera 121a, 121b, a timer function, a brightness control function, a capture effect setting function, a change of capture mode, and the like. The control image 240 may be distinguished from the first image 320 in FIG. 5B, but formed in substantially the same manner.

When a user's line of sight is sensed by the second camera 121a for a specific period of time, the controller 180 performs a capture function of the camera 121. In other words, the controller 180 can control the memory 170 to store the preview image 320. The second display region 151b displays a thumbnail image 230 corresponding to the stored preview image 320. The controller 180 can control thumbnail images corresponding to the stored images to be sequentially displayed in the second display region 151b.

In addition, the controller 180 can display an image corresponding to the thumbnail image 230 in the first display region 151a based on a touch applied to the thumbnail image 230. Otherwise, the controller 180 can activate a specific application (gallery application) for displaying the image based on a touch applied to the thumbnail image 230.

Further, the controller 180 can execute the capture function based on a touch applied to the capture icon 321. According to the present embodiment, a user's line of sight may be sensed to capture an image, and thus the user can not be required to move his or her hand, thereby minimizing vibration that can occur while capturing.

In addition, the second camera 121a may sense a user's gesture as well as his or her line of sight. Otherwise, the capture may be performed after a delay time of several seconds subsequent to sensing the line of sight. Otherwise, the user's line of sight may be sensed by a gesture sensor unit disposed on a front surface of the mobile terminal. When a specific gesture (fist clenching and opening, a palm sensed for several seconds, a user's eye blinking, and the like) is sensed, the controller 180 can form a control command for executing the capture function.

FIG. 7B illustrates a method of controlling a capture function by the second camera 121a. The controller 180 displays a preview image 320' acquired by the second camera 121a in the first display region 151a based on a specific control command. When a user's viewing to the first display region 151a is sensed by the second camera 121a, the controller 180 stores the preview image 320' acquired by the second camera 121a. The second display region 151b may display a thumbnail image 230 of the stored image.

Otherwise, when a user's line of sight viewing the second camera 121a is sensed, the controller 180 displays an indicator 241 in the second display region 151b. The indicator 241 may include information of capturing subsequent to a specific period of time (several seconds), and may include a numeral (seconds) indicating a time. For example, the capture may be performed after 3 seconds subsequent to displaying the indicator 241. According to the present embodiment, the user can perform a capture function without a touch input using his or her hand even when he or she uses the second camera.

Referring to FIG. 7C, while the preview image 320 acquired by the camera 121 is displayed on the first display region, a control image 240 is displayed on the second display unit. The control image 240 may include a capture icon 242 for receiving a touch. In this instance, a capture icon is not displayed in the first display region. Accordingly, the user can apply a touch to the second display region 151b to perform a capture function.

Figure 8:
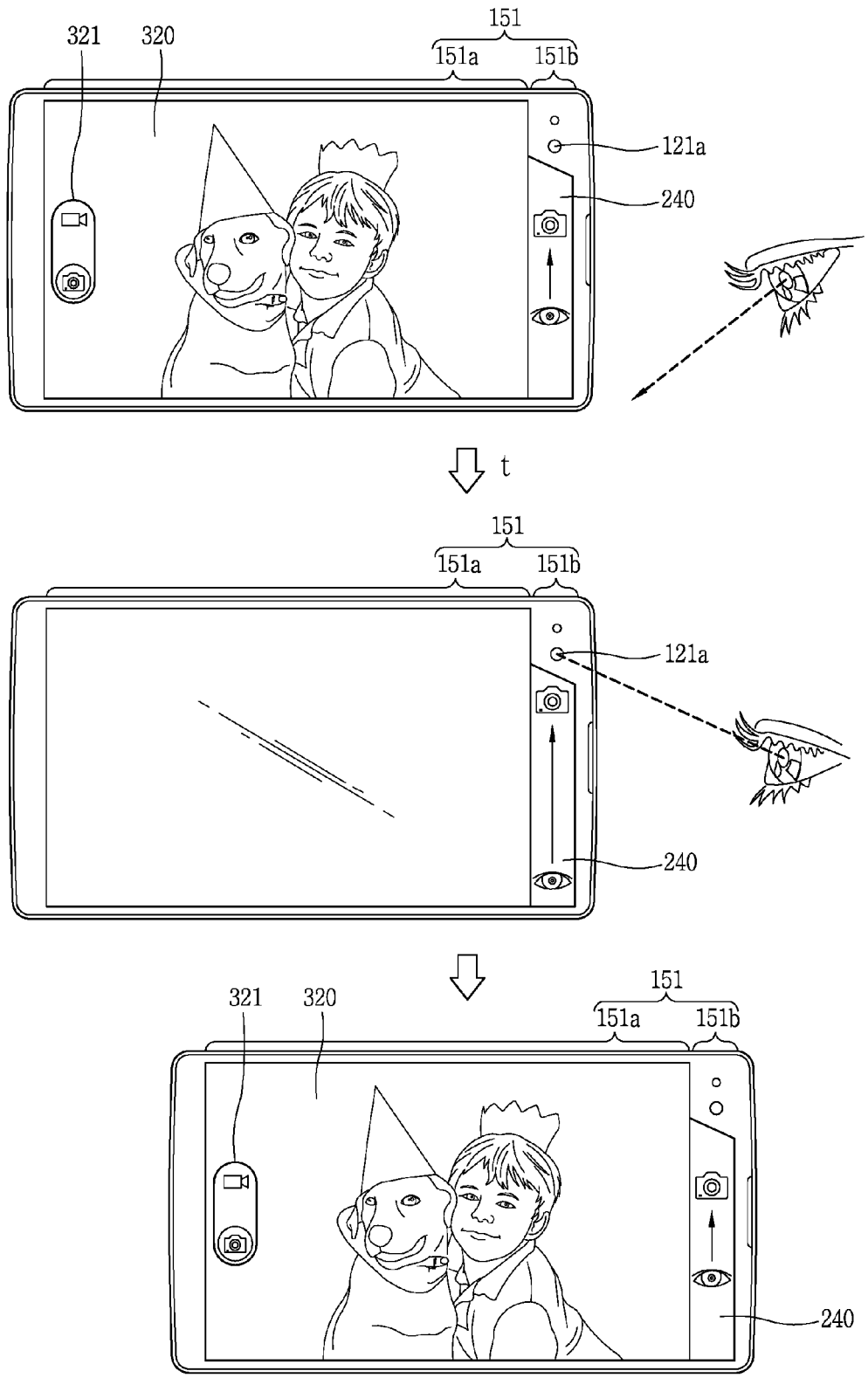
FIG. 8 is a conceptual view illustrating a control method of controlling the activation of a camera according to a sensed line of sight.

FIG. 8 is a conceptual view illustrating a control method of controlling the activation of a camera according to a sensed line of sight. The first display region 151a displays a preview image 320 acquired by the camera 121 and a capture icon 321 for capturing an image. Furthermore, the second display region 151b displays the control image 240.

The controller 180 performs the capture function when a line of sight is sensed by the second camera 121a. However, when a user's line of sight is not sensed for a preset period of time, the controller 180 switches the camera to an inactive state.

The controller 180 can switch the first display region 151a to an inactive state based on an inactive state of the camera. However, the second display region 151b displays a first image 210 including guide information associated with the activation of the camera. Accordingly, the controller 180 activates the camera 121 again by the second camera 121a. A preview image 320 acquired based on the activation of the camera 121 is displayed in the first display region 151a. The control image 240 is switched to the control image 240.

In addition, when a user's line of sight is not sensed for a specific period of time when the first display region 151a is in an inactive state, the controller 180 can switch both the first and the second display unit 151a, 151b to an inactive state. According to the present embodiment, the controller 180 can sense a line of sight to control the camera and the display unit, thereby minimizing power consumption when not used by a user.

Figure 9A:
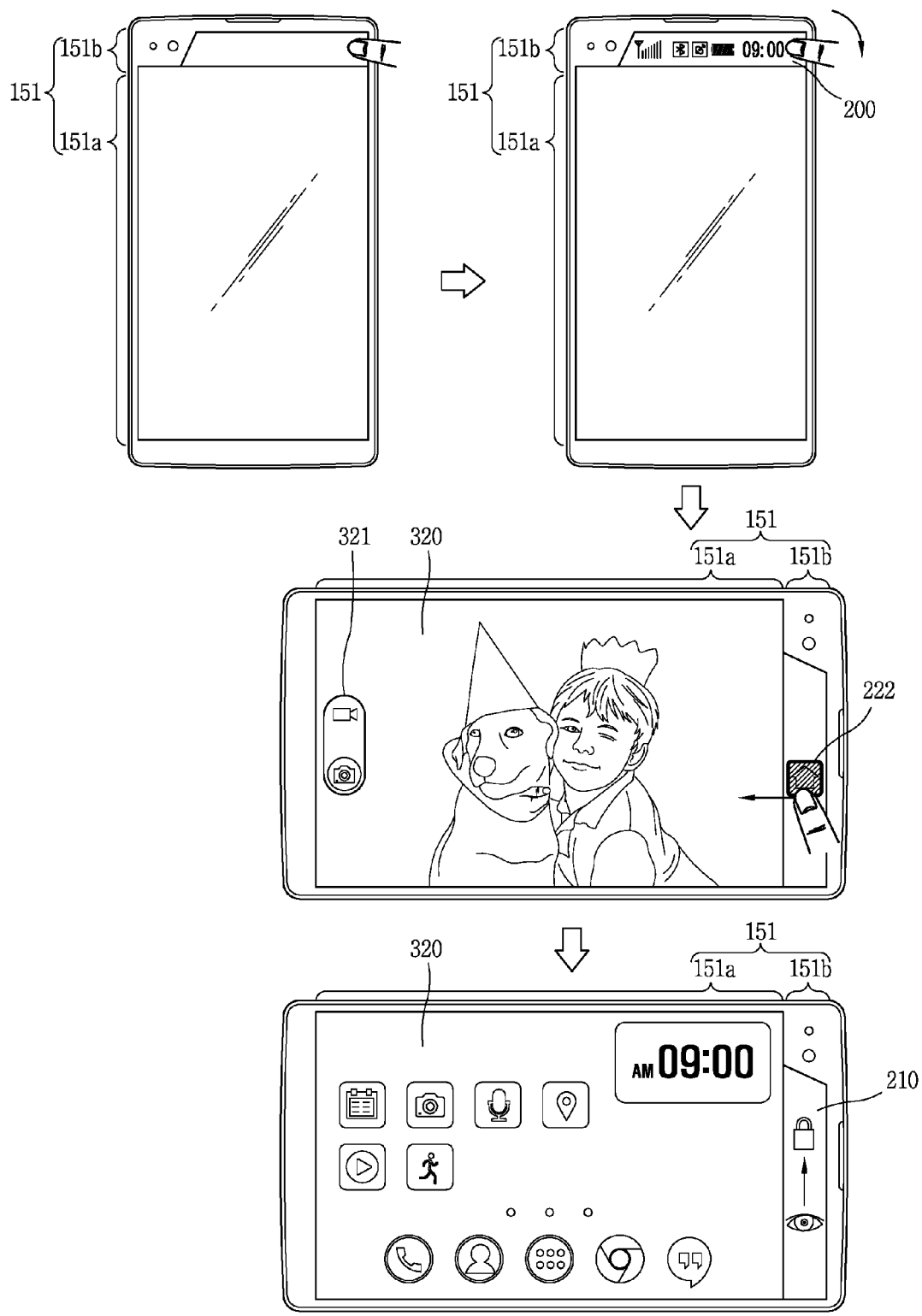
FIGS. 9A and 9B are conceptual views illustrating a control method when part of the display unit is switched to an inactive state.
Figure 9B:
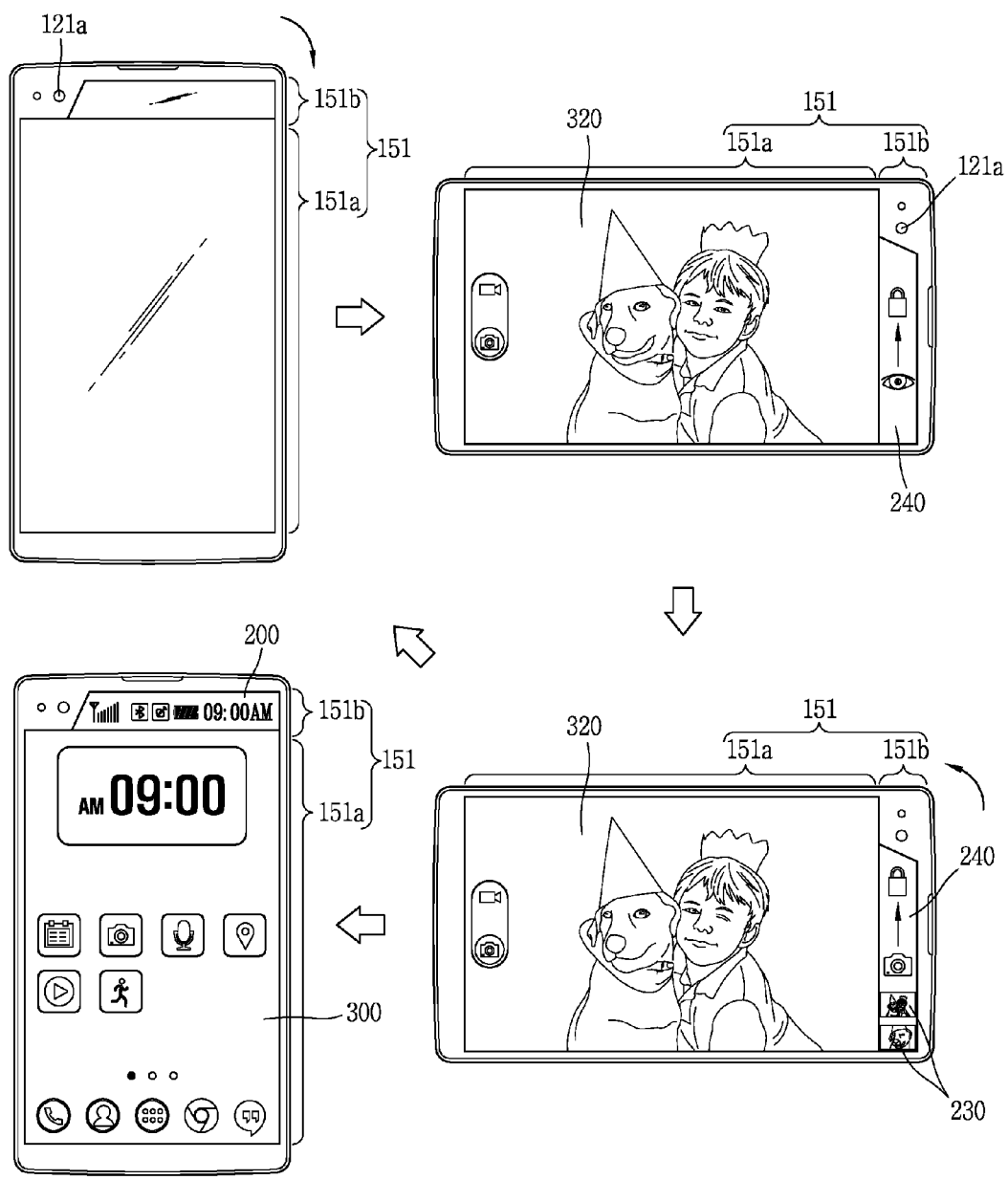

FIGS. 9A and 9B are conceptual views illustrating a control method when part of the display unit is switched to an inactive state. Referring to FIG. 9A, When the first and the second display unit 151a, 151b is in an inactive state, the controller 180 can activate the second display region to display the operation information 200 when a touch is applied to the second display region 151b.

When the movement of the terminal body is sensed when a touch is applied to the second display region 151b while displaying the operation information 200, the controller 180 can activate the camera 121. The first display region 151a displays a preview image 320 acquired by the camera 121, and the second display region 151b displays a fourth image 222.

The controller 180 can display a home screen page 300 in the first display region 151a based on a touch applied to the second display region 151b. However, the present disclosure may not be necessarily limited to the home screen page 300, and may display an execution screen of an application that has been mostly recently performed, a locked screen when lock is set, and the like.

The second display region 151b displays the first image 210 again. In other words, the controller 180 can activate the camera again when a user's line of sight is sensed when the home screen page 300 is displayed. According to the present embodiment, when the display unit is in an inactive state, the user can apply a touch to the second display region 151b to conveniently activate a camera function according to a posture change of the terminal body.

Referring to FIG. 9B, when the first and the second display unit 151a, 151b are in an inactive state, the controller 180 activate the camera based on the movement of the terminal body. In a horizontal mode, the first display region 151a displays a preview image 320 acquired by the camera 121, and the second display region 151b displays a control image 240 including guide information for forming a capture control command of the camera.

The controller 180 executes a capture function of the camera based on a user's line of sight. The second display region 151b displays a thumbnail image 230 of the captured (stored) image. When the horizontal mode is switched to a vertical mode based on the movement of the terminal body, the controller 180 can switch the camera to an inactive state again, display a home screen page 300 in the first display region 151a, and display the operation information 200 in the second display region 151b.

Otherwise, when switched to the vertical mode, the display unit may be switched to an inactive state. According to the present embodiment, a user can change the posture of the terminal body to quickly execute the camera and perform a capture function based on a sensed line of sight even when the display unit is in an inactive state, thereby minimizing the input of a control command such as a touch or the like.

Figure 10A:
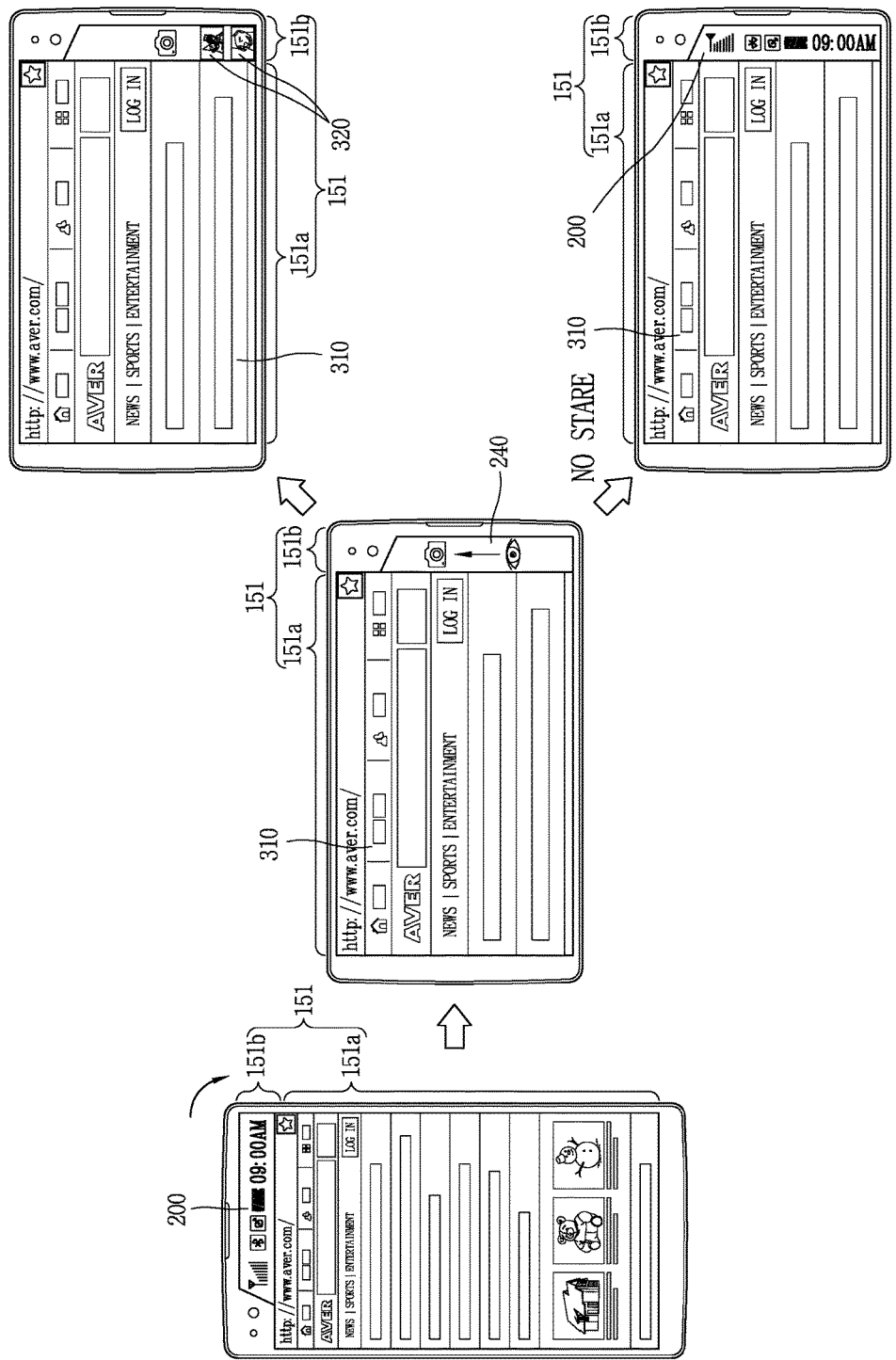
FIGS. 10A through 10C are conceptual views illustrating a control method of performing a capture function without displaying a preview image.
Figure 10B:
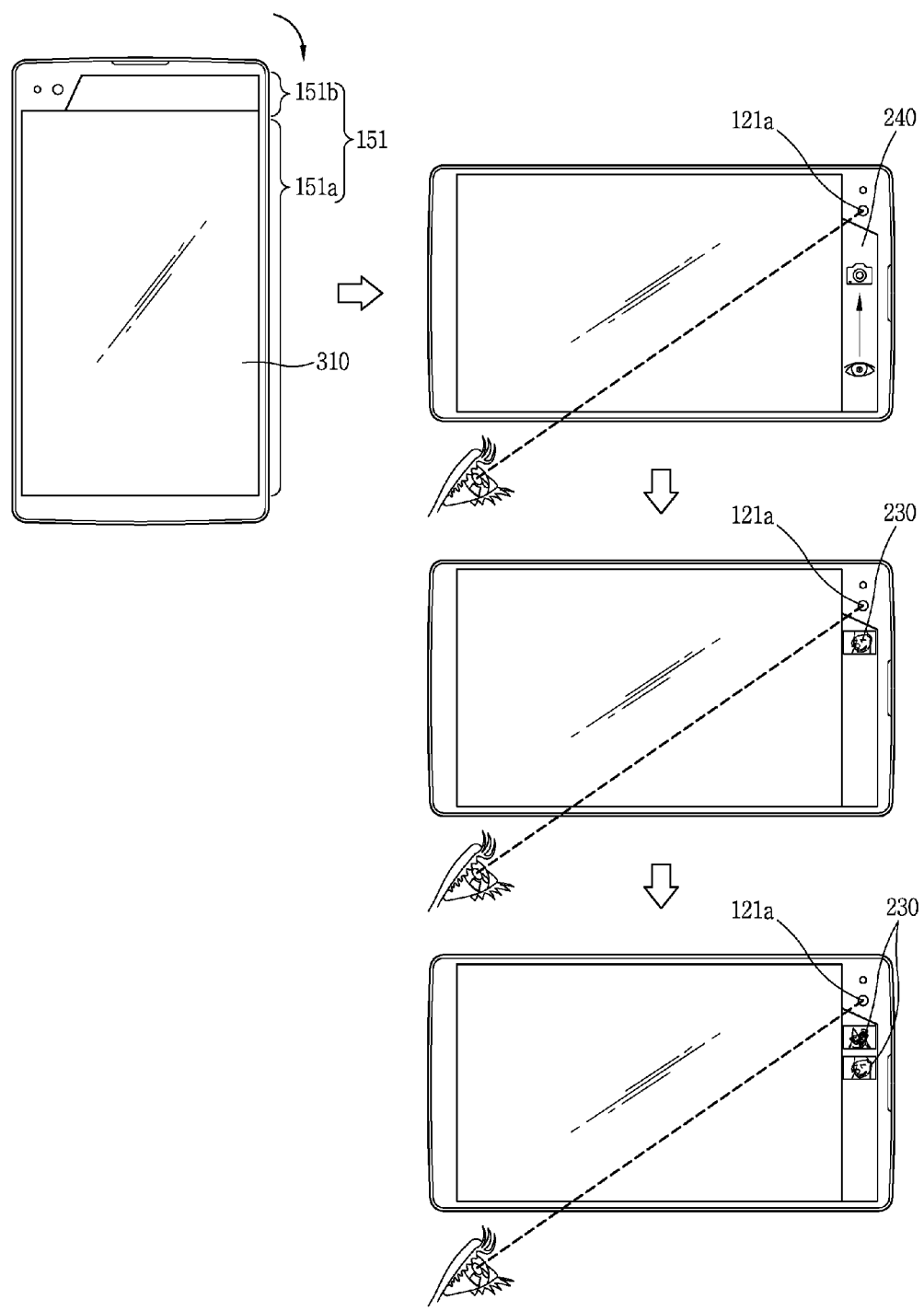
Figure 10C:
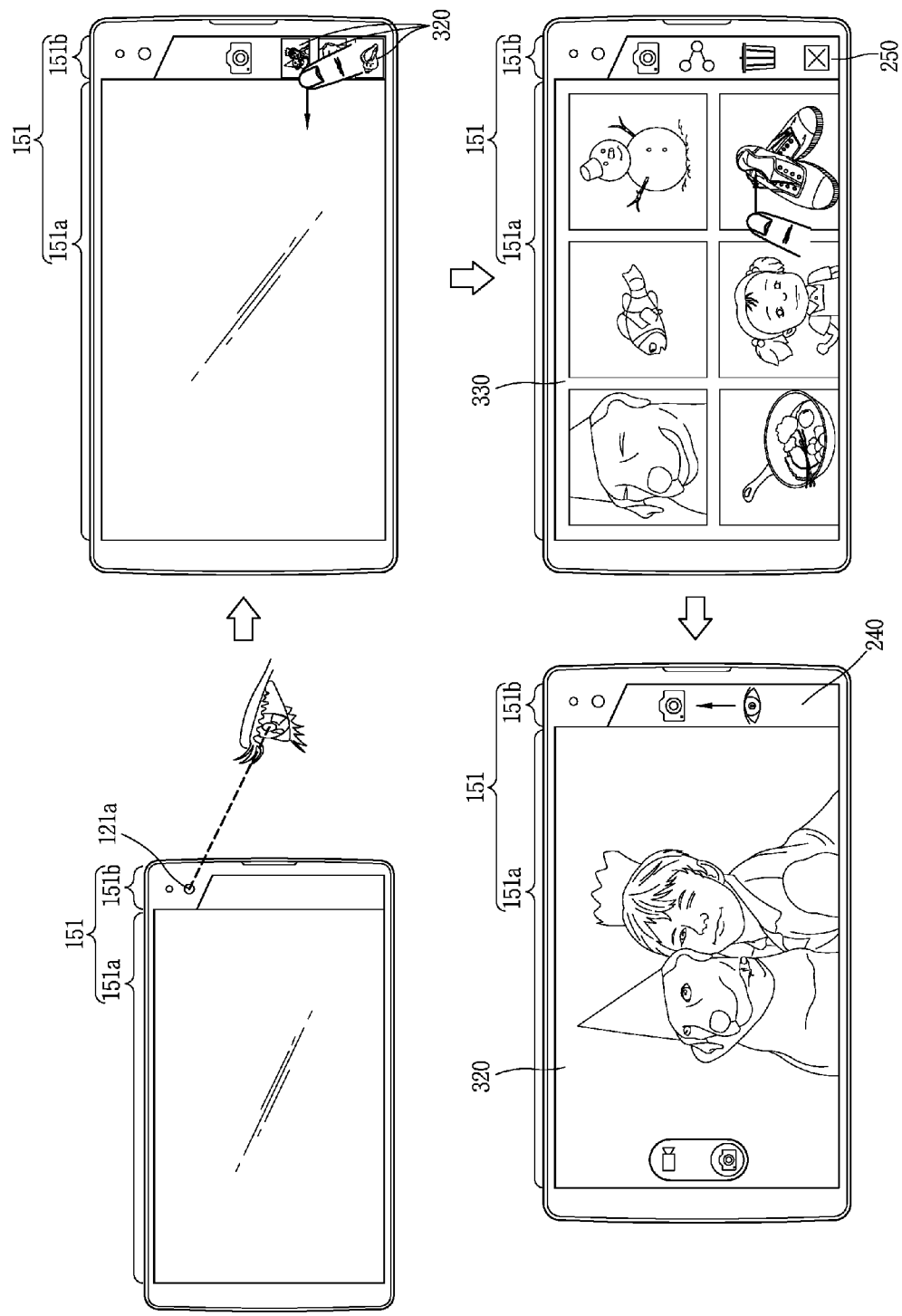

FIGS. 10A through 10C are conceptual views illustrating a control method of performing a capture function without displaying a preview image. Referring to FIG. 10A, the first display region 151a displays the screen information 310, and the second display region 151b displays the operation information 200. When the movement of the terminal body is sensed, the controller 180 switches from a vertical mode to a horizontal mode. The first display region 151a changes the display direction of the screen information 310.

When switched to the horizontal mode, the controller 180 activates the camera, and displays the control image 240 including guide information for executing the capture function in the second display region 151b. In this instance, the first display region 151a continuously displays the screen information 310, and does not display a preview image.

When a user's line of sight is not sensed by the second camera for a preset period of time, the controller 180 switches the camera to an inactive state. When the camera 121 is switched to an inactive state, the controller 180 switches the control image 240 to the operation information 200. When a user's line of sight is sensed, the controller 180 performs the capture function, and controls the display unit to display a thumbnail image 320 of the captured image in the second display region 151b. However, a control command for performing the capture function may not be necessarily limited to the line of sight. For example, the image may be captured based on a specific gesture, a touch applied to the second display region 151b, or the like.

Further, the present disclosure may limit the camera to be activated when a touch is applied to the operation information and the posture of the terminal body is changed (or when the touch is applied). In this instance, it may be possible to prevent a problem of the camera being activated based on an unintentional change of the posture. According to the present embodiment, the user can activate a capture function while continuously receiving screen information that has been previously displayed.

A method of controlling a capture function of the camera in an inactive state of the display unit will be described with reference to FIG. 10B. When the first and the second display unit 151a, 151b are in an inactive state, the controller 180 can activate the camera 121 when the posture is changed based on the movement of the terminal body. When the camera 121 is activated, the controller 180 displays the control image 240 on the second display region 151b. In addition, when a user's line of sight (or a gesture, a touch input or the like for forming a capture control command) the controller 180 controls the display unit to allow the control image 240 to disappear. In this instance, the camera 121 is switched to an inactive state again.

However, the controller 180 performs a capture function based on a line of sight sensed while displaying the control image 240, and displays a thumbnail image 230 corresponding thereto in the second display region 151b when an image is captured. When a plurality of capture control commands are formed (for example, when a user's line of sight is continuously sensed, when a user's eye is blinking, when an additional touch or gesture is sensed), a plurality of sequentially captured thumbnail images 230 are displayed in the second display region 151b.

While the display function of the camera is maintained, the first display unit maintains an inactive state. In other words, a preview image acquired by the camera is not displayed. Accordingly, a user can not be required to check the preview image or more quickly perform a capture function when he or she wants to perform the capture function without any check.

Referring to FIG. 10C, the controller 180 can maintain the second camera 121a, the gesture sensor or the like in an active state while the display unit is in an inactive state. Otherwise, it may be activated at specific time intervals. In a horizontal mode, the camera may have been previously in an active state. Otherwise, when a user's line of sight is sensed by the second camera 121a, the controller 180 can activate the camera.

When a line of sight is sensed by the second camera 121a and the display unit is in an inactive state, the controller 180 captures an image by the camera 121, and displays a thumbnail image 320 corresponding thereto in the second display region 151b. The controller 180 controls the display unit to display screen information 330 including a plurality of images in the first display region 151a based on a touch applied to the second display region 151b. The touch may be a dragging type of touch or a flicking type of touch applied to the second display region 151b or extended from the second display region 151b to the first display region 151a.

The screen information 330 may correspond to the screen information of a specific application. Otherwise, the screen information 330 may include only images captured while the display unit is in an inactive state. When the screen information 330 is displayed, the second display region 151b may display control icons 250 for controlling the images.

Further, the controller 180 can edit, share, delete, copy each image or the like based on a touch applied to the first and the second display unit 151a, 151b. Furthermore, the second display region 151b may include an end icon for ending the display of the screen information 330. When a touch is applied to the end icon, the controller 180 controls the display unit to allow the screen information 330 to disappear.

The controller 180 controls the display unit to display the thumbnail image 230 again based on a specific type of touch applied to the screen information 330. In this instance, the control icon 250 is switched to the control image 240 again. Here, the specific type of touch may corresponds to a dragging touch moving toward the second display region 151b. According to the present embodiment, a user can check and edit images captured when they are not checked by their preview images.

Figure 11A:
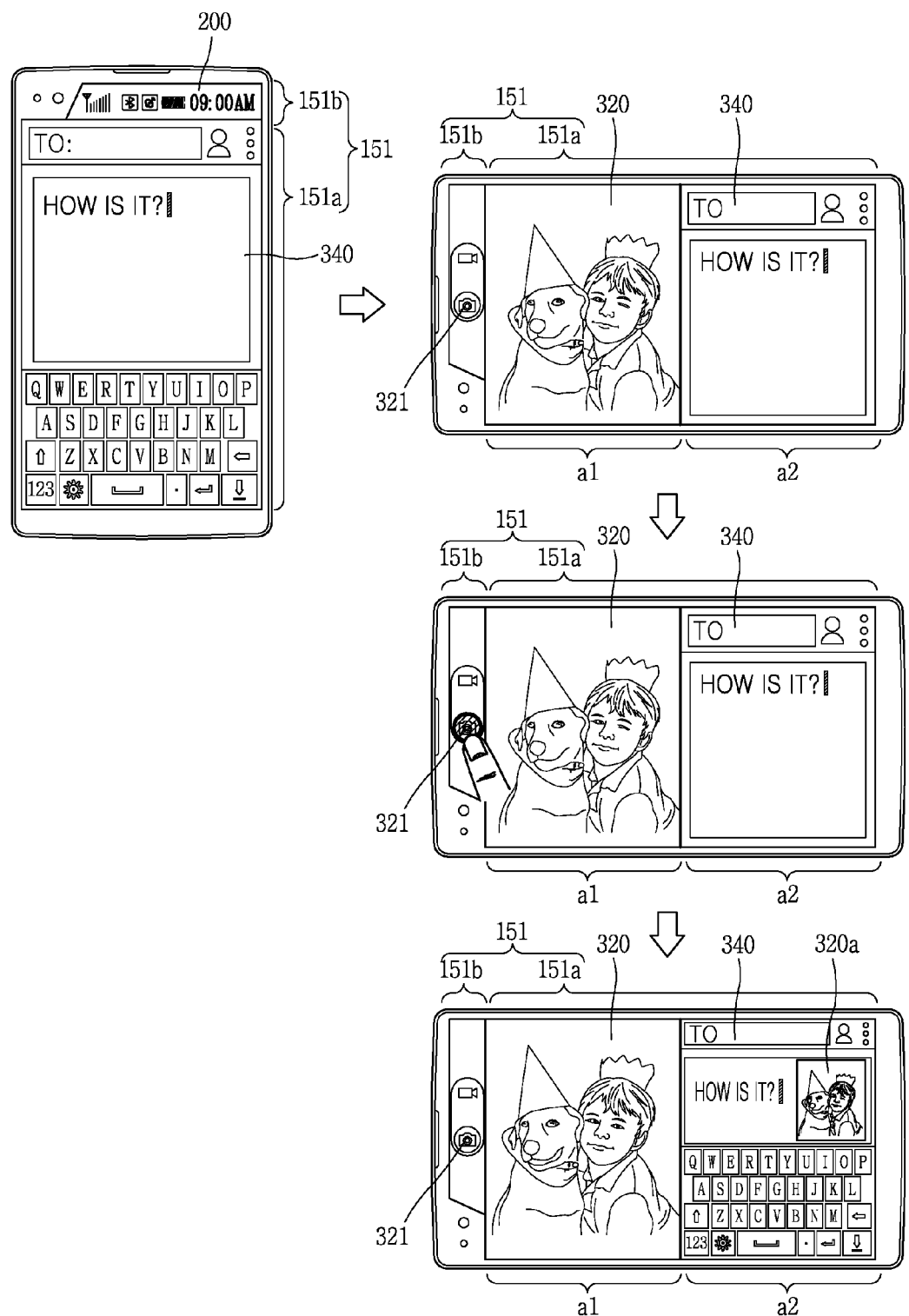
FIGS. 11A through 11C are conceptual view illustrating a control method of controlling a camera during the execution of a specific application.
Figure 11B:
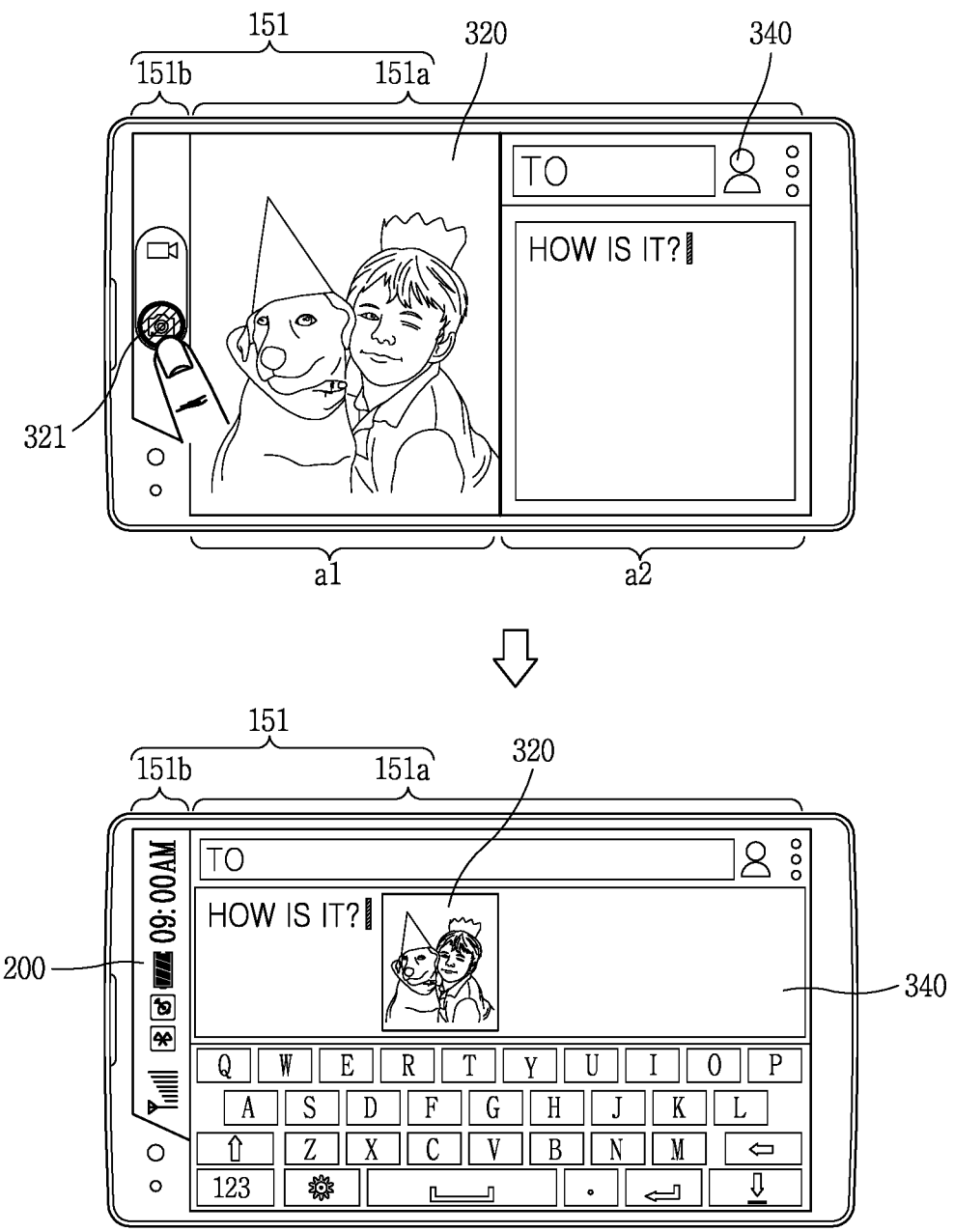
Figure 11C:
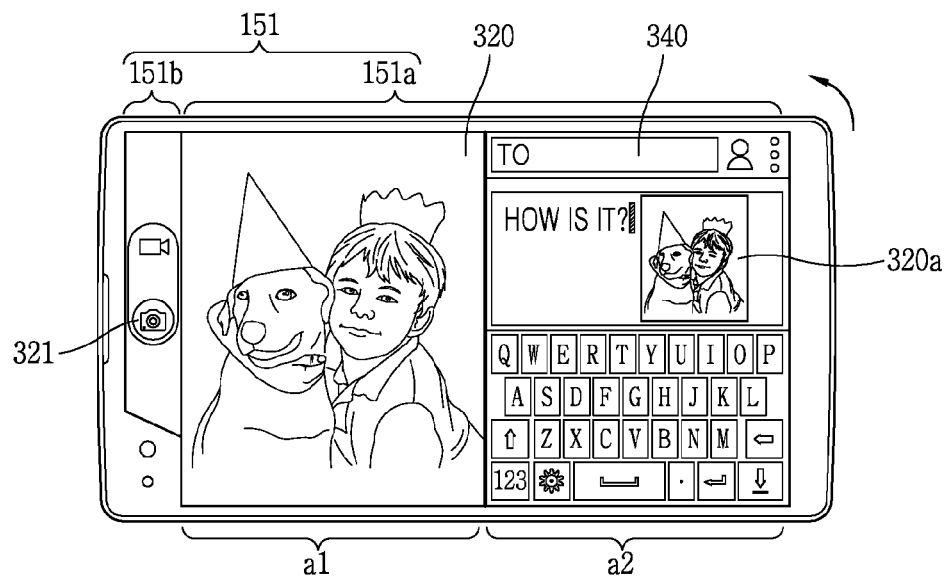
Figure 11C:
Figure 11C:
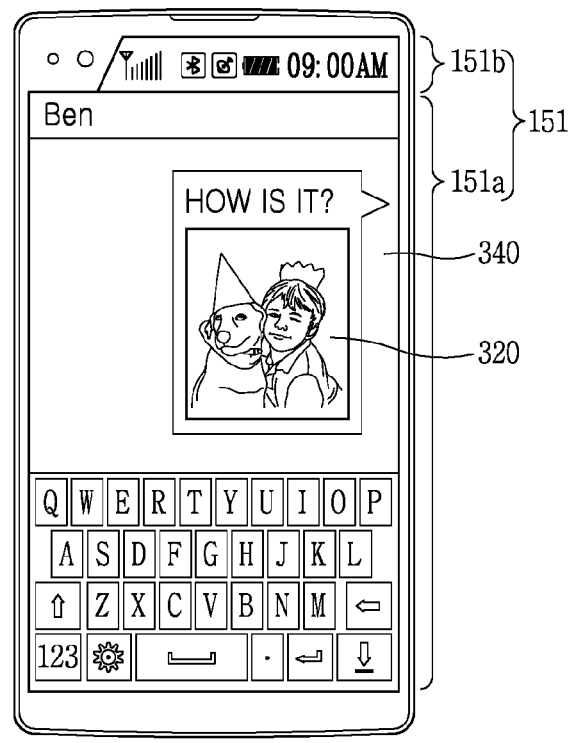

FIGS. 11A through 11C are conceptual view illustrating a control method of controlling a camera during the execution of a specific application. When a specific application is performed, the first display region 151a displays an execution screen 340 of the specific application. For example, the application may corresponds to a message application, but may not be necessarily limited to this. The specific application may include a function of inputting, storing, transmitting a captured image or uploading the captured image to a specific server.

The controller 180 senses the movement of the terminal body, and divides the first display region 151a into a first and a second region (a1, a2) when switched to a horizontal mode. When switched to the horizontal mode, the controller 180 activates the camera, and displays the preview image 320 acquired by the camera in the first region (a1). Furthermore, the controller 180 displays the execution screen 340 in the second region (a2). A capture icon 321 of the camera may be displayed in the second display region 151b.

The controller 180 can perform the capture function based on a touch applied to the capture icon 321. However, a control command for executing a capture function may not be necessarily limited to this, and may be controlled by sensing a user's line of sight, sensing a gesture or the like.

When a capture function is performed by the control command, the controller 180 displays the captured image 320a in part of the second region (a2). The execution screen 340 may include an input window capable of entering an image, and the image 320a is displayed on the input window. While the image 320a is displayed on the input window, the first region (a1) may continuously display the preview image 320 acquired by the camera.

According to the present embodiment, when a specific application is desired to be controlled using an image captured by the camera, it may be possible to immediately form a captured image based on the movement of the terminal body. Accordingly, when an image is needed, it may not be required to pass through the process of ending an application being performed to execute a camera function.

Referring to FIG. 11B, when a capture function is performed by the camera 121, the controller 180 displays the execution screen 340 and the image 320a in the entire first display region 151a. According to the present embodiment, when the capture function of the camera is performed, the camera 121 is switched to an inactive state. Accordingly, the operation information 200 is displayed again in the second display region 151b.

Referring to FIG. 11C, the controller 180 can display the preview image 320 in the first region (a1) in the horizontal mode even subsequent to executing the capture function. Furthermore, the controller 180 displays the execution screen 340 including the image 320a in the second region (a2).

The controller 180 switches the horizontal mode to the vertical mode again when the movement of the terminal body is sensed. In this instance, the first display region 151*a* displays only the execution screen 340 including the image 320*a*. When switched to a vertical mode again, the controller 180 can deactivate the camera.

Figure 12A:
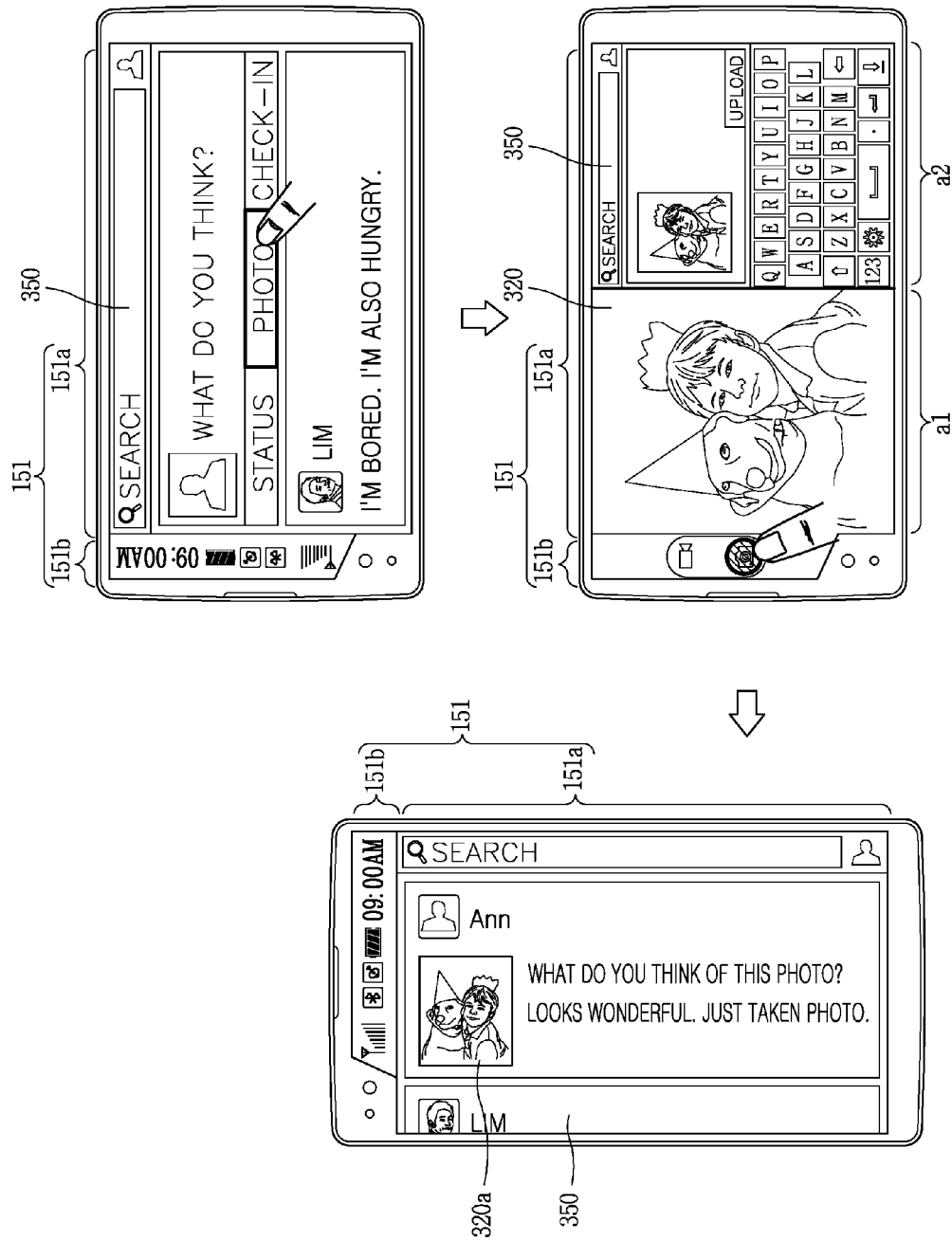
FIGS. 12A and 12B are conceptual views illustrating a control method of controlling a camera during the execution of a specific application according to another embodiment.
Figure 12B:
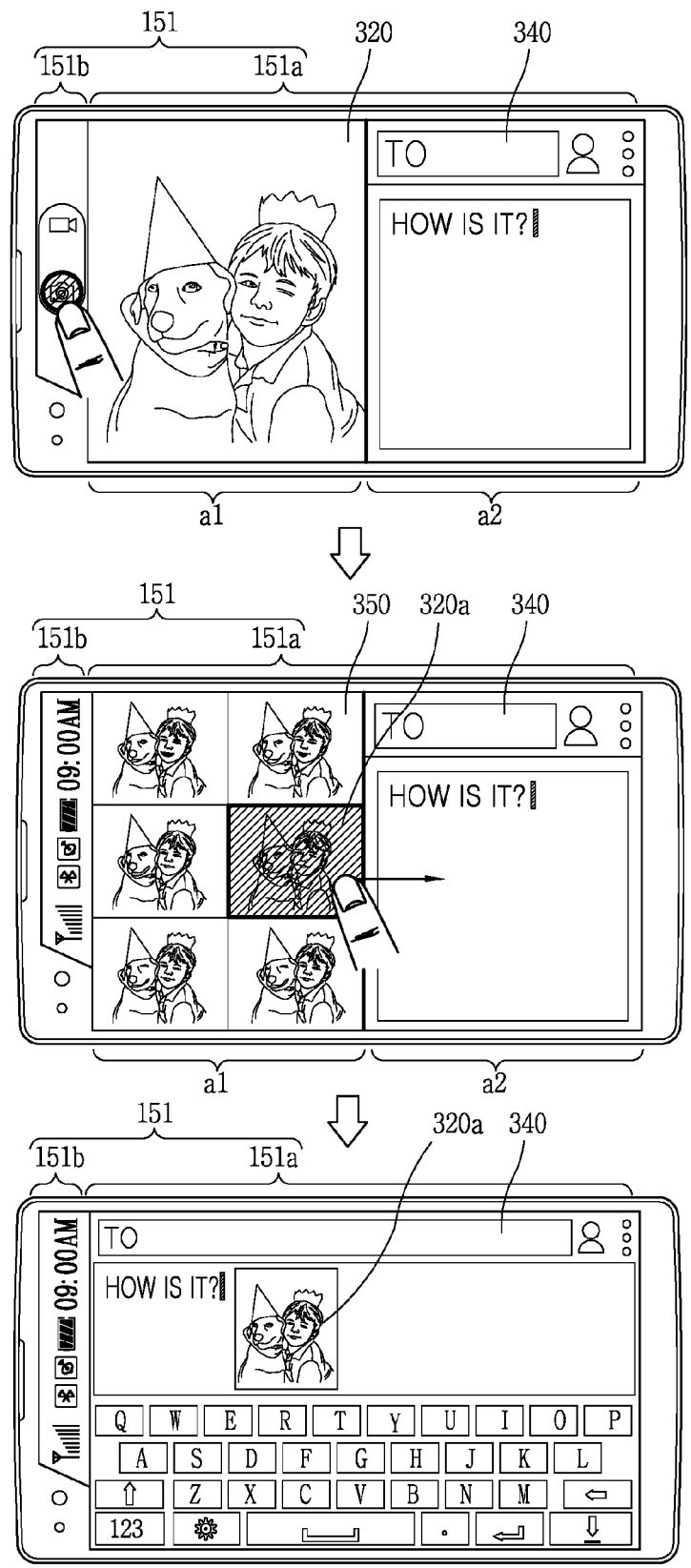

FIGS. 12A and 12B are conceptual views illustrating a control method of controlling a camera during the execution of a specific application according to another embodiment. Referring to FIG. 12A, when a specific application is activated, an execution screen 350 is displayed in the first display region 151*a*. The execution screen 350 may include a graphic image or the like for entering an image.

The controller 180 divides the first display region 151*a* into a first and a second region (a1, a2) based on a touch applied to the graphic image. The controller 180 displays the execution screen 350 including an input window 351 capable of entering the image or the like in the second region (a2). The controller 180 displays a preview image 320 captured by the camera 121 in the second region (a2).

The controller 180 displays an image 320*a* captured by a control command on the input window 351. In addition, when a control command for the capture is additionally applied, the controller 180 can display a newly captured another image instead of the image 320*a* or additionally enter another image on the input window 351.

When the movement of the terminal body is sensed when the captured image is included in the execution screen 350, the controller 180 switches from the horizontal mode to the vertical mode. When switched to the vertical mode, the controller 180 can perform one function of the specific application. For example, the one function may correspond to uploading, transmission to an external device of specific information including the image, and the like.

In the vertical mode, the first display region 151*a* displays an execution screen subsequent to executing the one function as a whole. In other words, a preview image displayed in the first region (a1) disappears. Furthermore, when switched to the vertical mode, the controller 180 deactivates the camera. In this instance, the controller 180 displays the operation information 200 in the second display region 151*b*.

According to present disclosure, when a captured image is needed for the operation of a specific application, a user can capture an image while checking the execution screen. Furthermore, the controller 180 can perform one function of a specific application associated with a captured image according to the switching of the mode.

Referring to FIG. 12B, the first region (a1) displays a preview image 320 acquired by the activated camera, and the second region (a2) displays an execution screen 340 corresponding to the executed specific application. When a capture control command is applied, the controller 180 displays screen information 350 including a plurality of images. The plurality of images included in the screen information 350 may correspond to images on which a different visual effects are given to an image 320*a* captured by a single control command or include consecutive images captured at different time points, or the image 320*a* captured by a control command and prestored images.

The controller 180 displays an image 320*a* selected from the plurality of images on an input window of the execution screen 340 based on a touch applied to the second region (a2) from the first region (a1). The controller 180 controls the execution screen 340 to be displayed in the first display region 151*a* as a whole based on the touch. The execution screen 340 may include the selected image 320*a*.

According to the present embodiment, when a captured image is needed during the execution of a specific application, a user can activate a camera while displaying an execution screen, and more easily apply the captured image to an application.

Figure 13A:
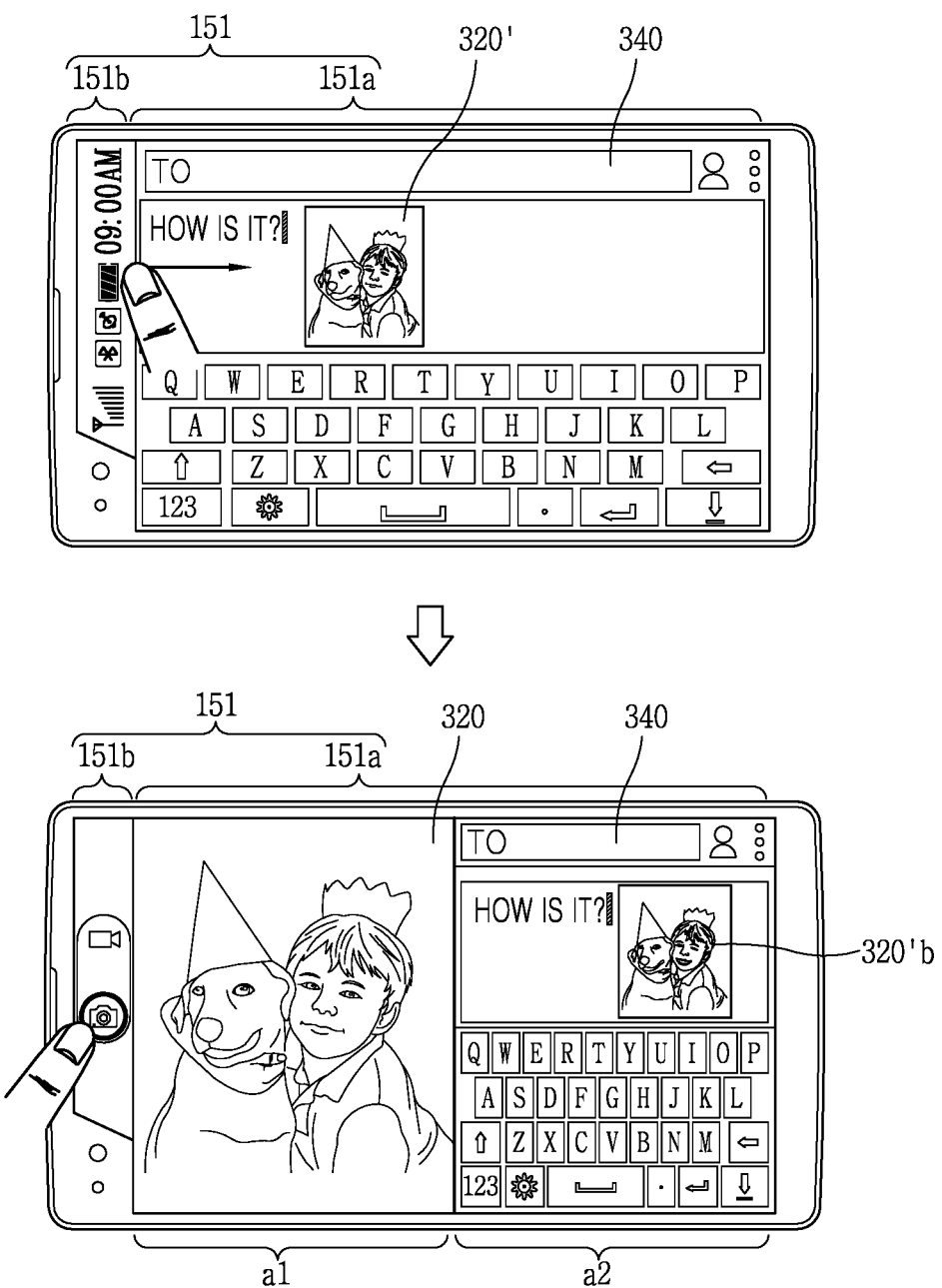

FIGS. 13A and 13B are conceptual views illustrating a control method of controlling a camera during the execution of a specific application according to still another embodiment. Referring to FIG. 13A, when a specific application is performed, an execution screen 340 of a specific application is displayed in the first display region 151*a*, and operation information 200 is displayed in the second display region 151*b*.

The controller 180 partitions the first display region 151*a* into a first and a second region (a1, a2) based on a touch applied to the first display region 151*a* from the second display region 151*b*. The controller 180 activates the camera based on the touch, and displays a preview image 320 acquired by the camera on the display unit. Furthermore, the controller 180 displays the execution screen 340 on the second region (a2). In other words, even when the execution screen is displayed in the entire first display region 151*a* in the horizontal mode, a user can apply a specific touch to activate the camera.

Referring to FIG. 13B, the controller 180 displays an execution screen 360 in the first display region 151*a* based on the execution of a specific application. For example, the specific application may correspond to a call function of transmitting and receiving voice signals with an external device.

The controller 180 switches a vertical mode to a horizontal mode based on the rotation of the terminal body sensed while the call function is performed. Furthermore, the controller 180 changes the display direction of the execution screen 360. The second display region 151*b* displays a first image 210 including guide information associated with the activation of the camera 121. For example, the controller 180 activates the camera 121 based on a user's line of sight sensed by the second camera 121*a*. According to the present embodiment, the controller 180 can display a preview image captured by the activation of the second camera 121*a* on the display unit.

When the camera 121 is activated, the controller 180 can activate a video call function. When the video call function is performed, the controller 180 displays a preview image 320' acquired by the camera in the first display region 151*a*. The controller 180 can request the transmission of an image from an external device connected thereto.

Otherwise, the controller 180 divides the first display region 151*a* into a first and a second region (a1, a2) based on the control command, and displays the preview image 320' in the first region (a1), and displays the execution screen 360 in the second region (a2). The controller 180 can transmit an image captured by the camera to an external device being connected thereto. However, in this instance, the controller 180 does not request the counterpart's image to the external device. According to the present embodiment, a user can capture an image while executing another application, and control the application using the captured image.

Figure 14B:
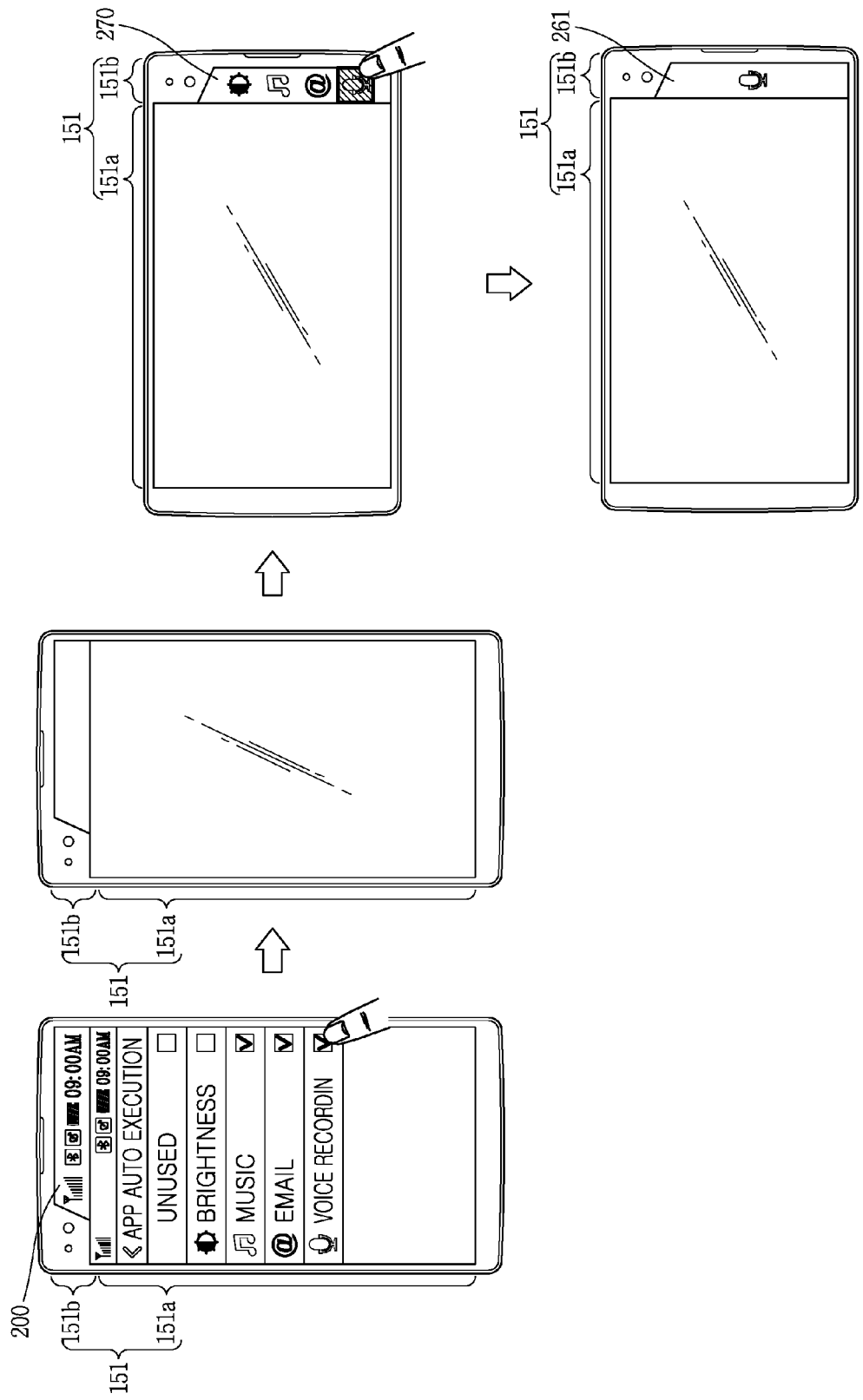

FIGS. 14A and 14B are conceptual views illustrating a control method of controlling a specific function while the first display region 151*a* is in an inactive state. Referring to FIG. 14A, the first display region 151*a* displays a setting screen 370. The setting screen 370 may include an application list corresponding to at least one application to be controlled while the first display region 151*a* is in an inactive state.

When the movement of the terminal body is sensed by the sensing unit when the first and the second display unit 151*a*, 151b are in an inactive state, the controller 180 changes from a vertical mode to a horizontal mode. When switched to a horizontal mode, the controller 180 displays a fifth image 260 for guiding a control method for activating a set application (recording function). For example, when a user's line of sight is sensed by the second camera 121a, the controller 180 can activate the microphone 122 (refer to FIG. 1B).

The second display region 151b may display an execution image 261 indicating the execution of the activation and recording function of the microphone 122 in the second display region 151b. While the application is performed, the first display region 151a maintains an inactive state. In other words, a user can check the execution status of an application through the second display region 151b.

Referring to FIG. 14B, when a plurality of applications on the application list are set, the controller 180 displays icons 270 corresponding to the each application on the second display region 151b in the horizontal mode. The controller 180 executes an application of the selected icon based on a touch applied to any one of the icons 270.

When an application is performed, the controller 180 displays an execution icon 261 indicating it in the second display region 151b. Further, when switched from the horizontal mode to the vertical mode again, the controller 180 can end the executed application or display an execution screen of the executed application in the first display region 151a.

According to the present embodiment, applications previously set by a user can be quickly performed by the movement of the terminal body. Furthermore, when there is no screen information to be displayed in the first display region 151a while executing a specific application, the first display region 151a may be maintained in an inactive state, thereby minimizing power consumption.

Figure 15A:
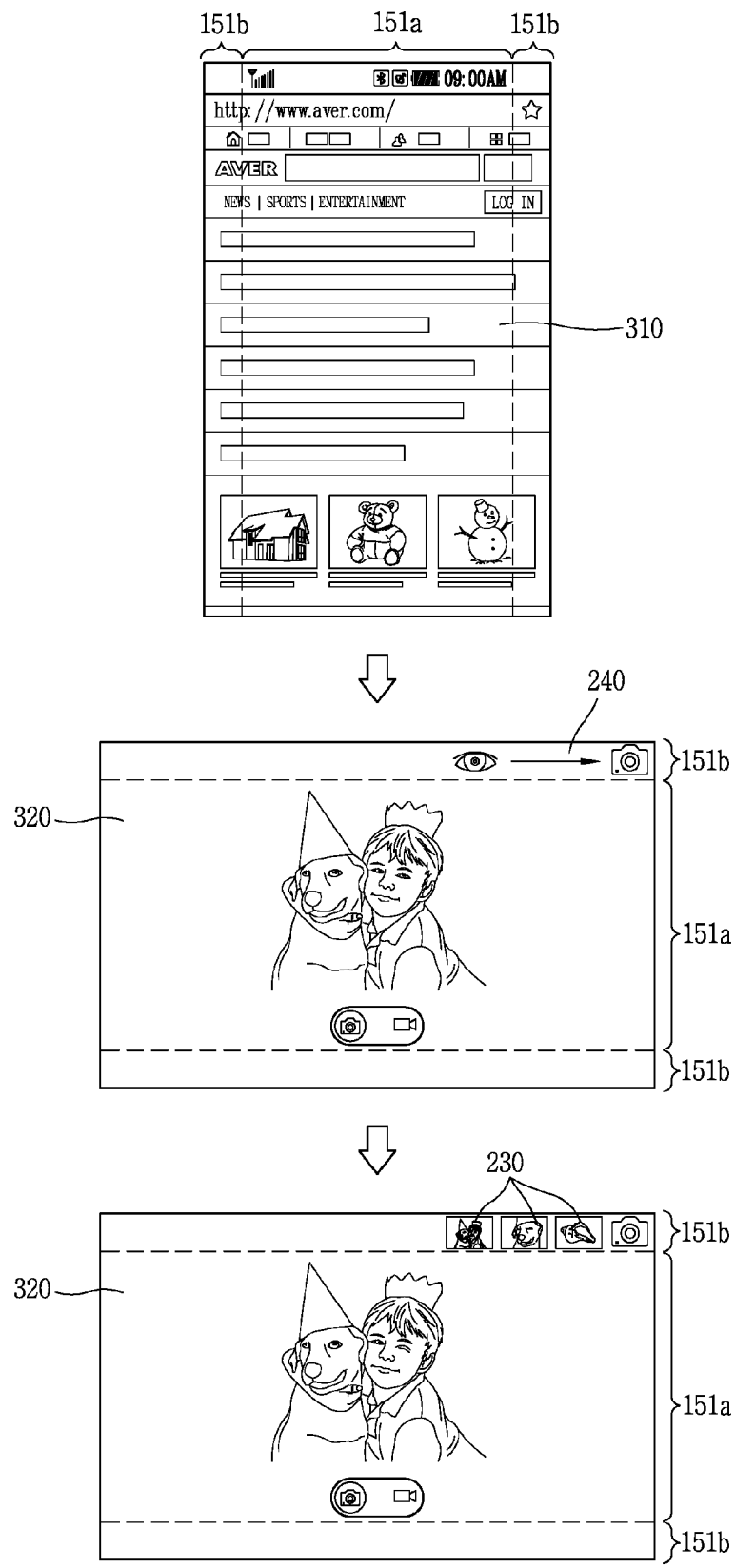
Figure 15B:
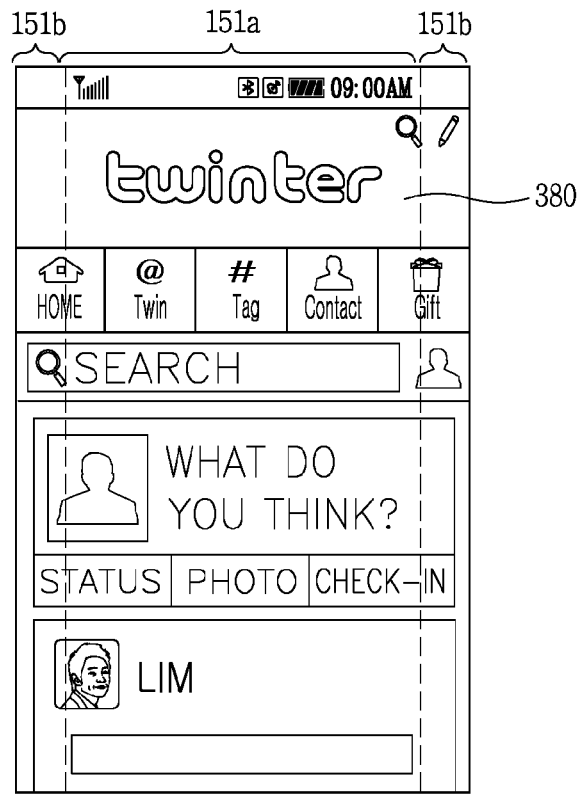
Figure 15B:
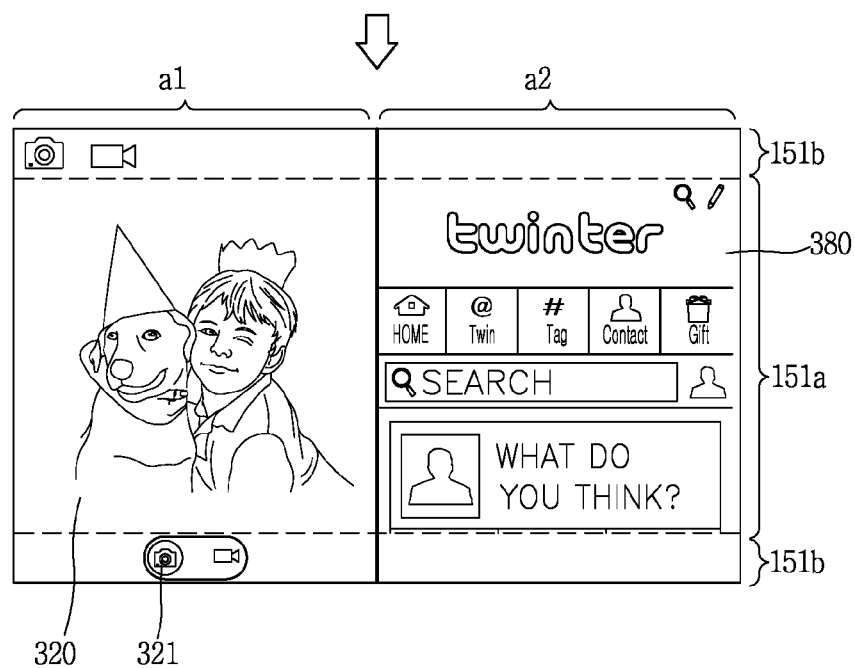

FIGS. 15A through 15C are conceptual views illustrating a control method of a mobile terminal including a first and a second display region according to another embodiment. In a mobile terminal according to an embodiment of the present disclosure, constituent elements excluding the structure of the first and the second display unit 151a, 151b may be applicable similarly to the foregoing embodiments.

Referring to FIGS. 3A and 15A, the second display region 151b may be extended in a horizontal direction of the terminal, and formed on at least one side of the left and right sides of the first display region 151a. The screen information 310 is displayed on the first and the second display unit 151a, 151b.

The controller 180 switches a vertical mode to a horizontal mode based on the movement of the terminal body. When switched to the horizontal mode, the controller 180 activates the camera 121, and displays a preview image 320 acquired according to the activation of the camera in the first display region 151a. The second display region 151b displays a control image 240 including guide information for controlling the camera. When a capture function of the camera is performed based on a specific control command, the controller 180 displays a thumbnail image 230 indicating a captured image in the second display region 151b.

Referring to FIG. 15B, when a specific application is performed, the controller 180 displays an execution screen 380 in the first and the second display unit 151a, 151b. When switched from the vertical mode to the horizontal mode, the controller 180 divides the first display region 151a into a first and a second region (a1, a2) based on the movement of the terminal body.

The controller 180 activates the camera, and displays a preview image 320 acquired by the camera in the first region (a1). The first region (a1) displays a capture icon 321 for receiving a touch to execute a capture function. The second region (a2) displays the execution screen 380. The second display region 151b may display a graphic image indicating a current capture mode.

Referring to FIG. 15C, when the screen information is displayed on the first display region 151a, the controller 180 switches from a vertical mode to a horizontal mode by the movement of the terminal body. The controller 180 changes the display direction of the screen information 300, and the second display region 151b displays an icon 390 of an executable application. Here, the executable application may corresponds to an application for which an execution screen of the application can be displayed in the second display region 151b while the screen information is displayed in the first display region 151a.

For example, the controller 180 displays the first execution screen 391 in the second display region 151b based on a touch applied to the icon 390, and continuously displays the screen information 300 on the first display region 151a. Otherwise, the controller 180 can display a second execution screen 392 of the application instead of the screen information 300 in the first display region 151a based on a touch applied to the icon 390.

The foregoing present invention may be implemented as codes readable by a computer on a medium written by the program. The computer-readable media may include all kinds of recording devices in which data readable by a computer system is stored. Examples of the computer-readable media may include hard disk drive (HDD), silicon disk drive (SDD), solid state disk (SSD), ROM, RAM, CD-ROM, magnetic tape, floppy disk, and optical data storage device, and the like, and also include a device implemented in the form of a carrier wave (for example, transmission via the Internet). In addition, the computer may include the controller 180 of the terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A mobile terminal, comprising:
   a terminal body;
   a camera;
   a sensor configured to sense a movement of the terminal body;
   a display formed on the terminal body to have a first display region configured to display screen information and a second display region distinguished from the first display region; and
   a controller configured to:
   in response to a sensed predetermined movement of the terminal body from a first position to a second position without a touching of the second display region, change a direction of the displayed screen information corresponding to the sensed predetermined movement of the terminal body, and
   in response to the sensed predetermined movement of the terminal body from the first position to the second position with the touching of the second display region, activate the camera and display a preview image in the first display region.

2. The mobile terminal of claim 1, wherein the controller is further configured to display guide information for controlling the camera in the first display region.

3. The mobile terminal of claim 1, further comprising:
a front camera disposed adjacent to the display,
wherein the controller is further configured to control the camera to capture the preview image when a user's line of sight is sensed by the front camera for a preset period of time.

4. The mobile terminal of claim 3, wherein the controller is further configured to display, in the second display region, settings related to the camera and controls for controlling the camera to capture the preview image.

5. The mobile terminal of claim 3, wherein the controller is further configured to control the camera to capture the preview image based on at least one of a touch applied to the display, a user's line of sight sensed by a front camera, and the sensing of a preset gesture.

6. The mobile terminal of claim 5, wherein the controller is further configured to control the camera to capture consecutive preview images while the user's line of sight is sensed by the front camera for the preset period of time.

7. The mobile terminal of claim 1, wherein the controller is further configured to display an image associated with the screen information in the second display region.

8. The mobile terminal of claim 7, wherein the controller is further configured to display the screen information again in the first display region based on a touch applied to the image.

9. The mobile terminal of claim 7, wherein the image comprises a plurality of icons corresponding to a plurality of applications being executed on the mobile terminal.

10. The mobile terminal of claim 7, wherein the controller is further configured to deactivate the camera and display the screen information again in the first display region or switch the first display region to an inactive state in response to the sensed predetermined movement of the terminal body being from the second position back to the first position.

11. The mobile terminal of claim 1, wherein the controller is further configured to display a thumbnail image of a captured image in the second display region based on a capture control command applied while displaying the preview image.

12. The mobile terminal of claim 11, wherein the controller is further configured to display a plurality of images corresponding to captured images in the first display region in response to a touching of the thumbnail image.

13. The mobile terminal of claim 12, wherein controller is further configured to display, in the second display region, at least one icon for editing the plurality of images.

14. The mobile terminal of claim 11, wherein the controller is further configured to:
continuously display the preview image in the first display region when the terminal body is rotated and a touch is applied to the preview image, and
display the screen information in the first display region when the terminal body is rotated and a touch is applied to the thumbnail image.

15. The mobile terminal of claim 1, wherein the controller is further configured to display a preset image or an image that has been most recently displayed when the terminal body is rotated, the camera is activated, and the first and the second display regions are in an inactive state.

16. The mobile terminal of claim 1, wherein the controller is further configured to continuously display the screen information in the first display region, and display an image captured by the camera in the second display region, when the terminal body is rotated and the screen information is displayed in the first display region.

17. The mobile terminal of claim 1, wherein the controller is further configured to divide the first display region into a first sub region and a second sub region, display the preview image in the first sub region, and display the screen information in the second sub region, when the terminal body is rotated by a preset angle when the screen information is displayed in the first display region.

18. The mobile terminal of claim 17, wherein the controller is further configured to display an image captured by the camera on the screen information.

19. A method of controlling a mobile terminal, the method comprising:
sensing, via a sensor of the mobile terminal, a movement of the terminal body;
displaying, via a display formed on a terminal body of the mobile terminal, screen information in a first display region and other information in a second display region distinguished from the first display region;
in response to a sensed predetermined movement of the terminal body from a first position to a second position without a touching of the second display region, changing, via a controller of the mobile terminal, a direction of the displayed screen information corresponding to the sensed predetermined movement of the terminal body; and
in response to the sensed predetermined movement of the terminal body from the first position to the second position with the touching of the second display region, activating, via the controller, the camera and display a preview image in the first display region.

20. A mobile terminal, comprising:
a terminal body;
a camera;
a display formed on the terminal body to have a first display region configured to display screen information and a second display region distinguished from the first display region;
a sensor configured to sense a movement of the terminal body; and
a controller configured to:
display a first image associated with the activation of the camera in the second display region when the terminal body is rotated by a preset angle, and
display a second image associated with the screen information in the second display region when the camera is activated.

21. The mobile terminal of claim 20, wherein the controller is further configured to:
activate the camera in response to a touch being applied to the second display region while the terminal body is moved, and
change a display direction of the screen information when a touch is applied to the first display region.

* * * * *